US011139984B2

(12) United States Patent
 Cole

(10) Patent No.: US 11,139,984 B2
(45) Date of Patent: Oct. 5, 2021

(54) INFORMATION PROCESSING SYSTEM, DEVICES AND METHODS

(71) Applicant: VOCALINK LIMITED, London (GB)

(72) Inventor: Michael Cole, Amersham (GB)

(73) Assignee: VOCALINK LIMITED, London (GB)

( * ) Notice: Subject to any disclaimer, the term of this patent is extended or adjusted under 35 U.S.C. 154(b) by 197 days.

(21) Appl. No.: 16/575,273

(22) Filed: Sep. 18, 2019

(65) Prior Publication Data
US 2020/0092107 A1  Mar. 19, 2020

(30) Foreign Application Priority Data

Sep. 19, 2018 (EP) ..................................... 18195366

(51) Int. Cl.
| | |
|---|---|
| *H04L 29/06* | (2006.01) |
| *H04L 9/32* | (2006.01) |
| *G06F 21/62* | (2013.01) |
| *H04L 9/30* | (2006.01) |

(52) U.S. Cl.
CPC ........ *H04L 9/3247* (2013.01); *G06F 21/6245* (2013.01); *H04L 9/3073* (2013.01); *H04L 9/3234* (2013.01); *H04L 9/3236* (2013.01)

(58) Field of Classification Search
CPC ... H04L 9/3247; H04L 9/3073; H04L 9/3234; H04L 9/3236; G06F 21/6245; G06F 21/645; G06F 21/31; G06Q 20/3825; G06Q 20/3829; G06Q 20/40; G06Q 20/4014; G06Q 20/3821
See application file for complete search history.

(56) References Cited

U.S. PATENT DOCUMENTS

| | | | |
|---|---|---|---|
| 7,735,125 B1 * | 6/2010 | Alvarez ............... | G06Q 20/027 726/9 |
| 9,298,901 B1 * | 3/2016 | Boss ....................... | G06F 21/31 |

(Continued)

FOREIGN PATENT DOCUMENTS

| | | |
|---|---|---|
| EP | 3318999 A1 | 5/2018 |
| WO | 2016128569 A1 | 8/2016 |

OTHER PUBLICATIONS

Extended European Search Report issued in European Application No. 18195366.2, dated Mar. 19, 2019, 7 pages.

*Primary Examiner* — Sher A Khan
(74) *Attorney, Agent, or Firm* — Talem IP Law, LLP

(57) ABSTRACT

A system for verifying information associated with a user can include at least three devices. The first device is configured to transmit, to the second device, user-associated information, a unique identifier associated with the user-associated information and an identity digital signature generated using an identity private key associated with the user and a message comprising a previously determined hash of a portion of the user-associated information combined with the unique identifier. The second device is configured to generate the hash of the portion of the user-associated information combined with the unique identifier and transmit the generated hash and the identity digital signature to the third device. The third device is configured to lookup the generated hash in a database, verify the identity digital signature using the identity public key related to the generated hash in the database, and upon successful verification, transmit a success response to the second device.

6 Claims, 10 Drawing Sheets

| | | | |
|---|---|---|---|
| UK Passport | UKPassport.DocumentId | HF [P7123766E + Asset ID] | X |
| UK Passport | UKPassport.IssueDate | HF [2001-05-01 + Asset ID] | X |
| UK Passport | Person.FirstName | HF [Fred + Asset ID] | X |
| UK Passport | Person.LastName | HF [Flinstone + Asset ID] | X |

| | |
|---|---|
| UK Passport, UKPassport.DocumentId, HF [P7123766E + Asset ID] | X |
| UK Passport, UKPassport.IssueDate, HF [2001-05-01 + Asset ID] | X |
| UK Passport, Person.FirstName, HF [Fred + Asset ID] | X |
| UK Passport, Person.LastName, HF [Flinstone + Asset ID] | X |

(56) References Cited

U.S. PATENT DOCUMENTS

| | | | |
|---|---|---|---|
| 2004/0104266 A1* | 6/2004 | Bolle | G06F 21/645 |
| | | | 235/382 |
| 2005/0091495 A1 | 4/2005 | Cameron et al. | |
| 2010/0088338 A1* | 4/2010 | Pavoni, Jr. | G06Q 20/4014 |
| | | | 707/770 |
| 2010/0161468 A1* | 6/2010 | Hickman | G06Q 40/00 |
| | | | 705/35 |
| 2010/0332391 A1* | 12/2010 | Khan | G06F 21/31 |
| | | | 705/44 |
| 2013/0262857 A1* | 10/2013 | Neuman | H04L 63/18 |
| | | | 713/155 |
| 2015/0033305 A1* | 1/2015 | Shear | G06F 21/64 |
| | | | 726/6 |
| 2018/0013565 A1* | 1/2018 | Fox | H04L 9/0643 |
| 2020/0403992 A1* | 12/2020 | Huffman | H04W 12/06 |

\* cited by examiner

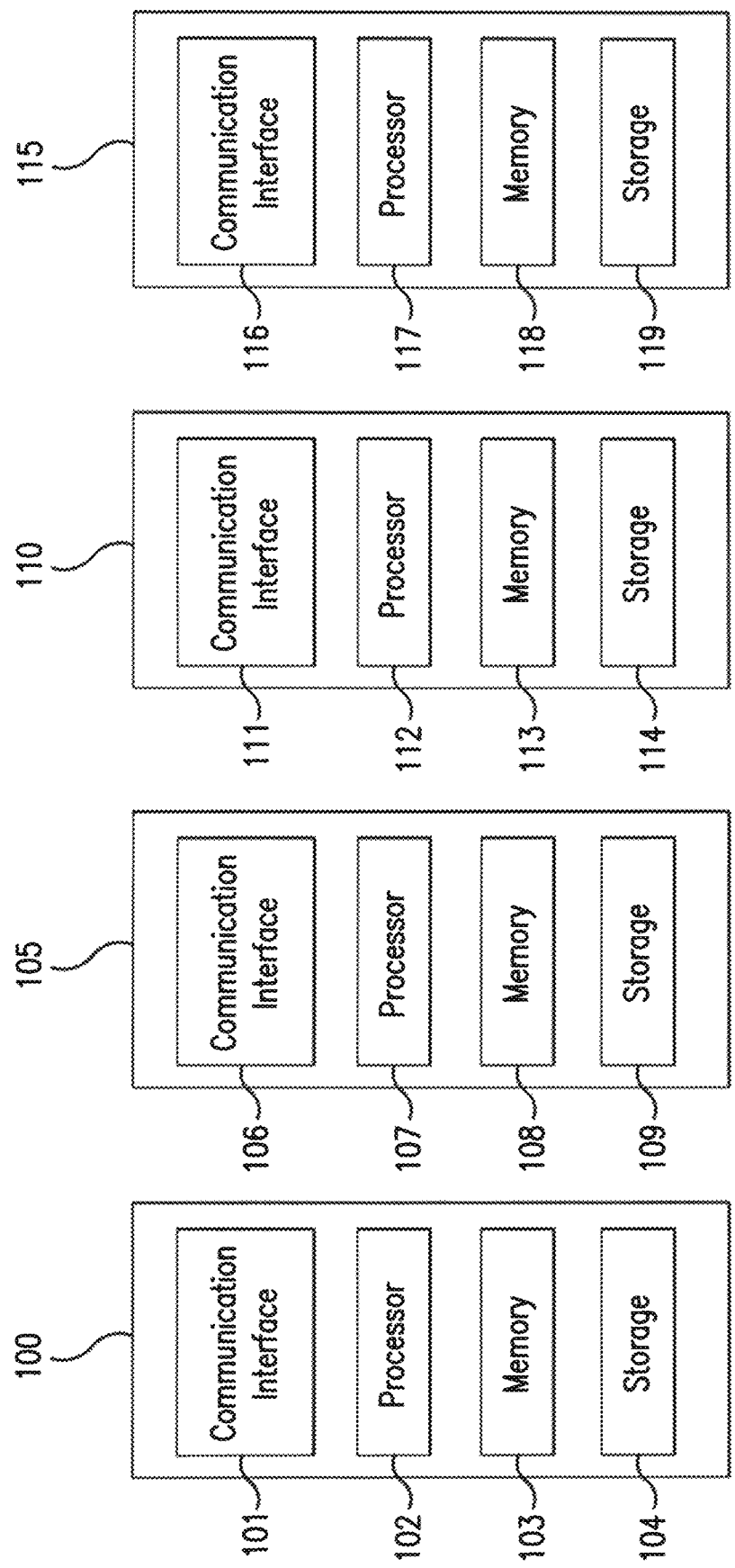

| UK Passport | UKPassport.DocumentId | HF [P7123766E + Asset ID] | X |
| UK Passport | UKPassport.IssueDate | HF [2001-05-01 + Asset ID] | X |
| UK Passport | Person.FirstName | HF [Fred + Asset ID] | X |
| UK Passport | Person.LastName | HF [Flinstone + Asset ID] | X |

FIG. 4A

| | |
|---|---|
| UK Passport, UKPassport.DocumentId, HF [P7123766E + Asset ID] | X |
| UK Passport, UKPassport.IssueDate, HF [2001-05-01 + Asset ID] | X |
| UK Passport, Person.FirstName, HF [Fred + Asset ID] | X |
| UK Passport, Person.LastName, HF [Flinstone + Asset ID] | X |

FIG. 4B

| Doc type: UK Passport | |
|---|---|
| Asset ID | |
| UKPassport.DocumentId | P7123766E |
| UKPassport.IssueDate | 2001-05-01 |
| Person.FirstName | Fred |
| Person.LastName | Flintstone |
| Identity token | |
| Identity digital signature | |

FIG. 4C

| Doc type: UK Passport | |
|---|---|
| UKPassport.DocumentId | HF [P7123766E + Asset ID] |
| UKPassport.IssueDate | HF [2001-05-01 + Asset ID] |
| Person.FirstName | HF [Fred + Asset ID] |
| Person.LastName | HF [Flinstone + Asset ID] |
| Identity token | |
| Identity digital signature | |

FIG. 4D

INFORMATION PROCESSING SYSTEM, DEVICES AND METHODS

TECHNICAL FIELD

The present disclosure relates to an information processing system, devices and methods.

BACKGROUND

The "background" description provided herein is for the purpose of generally presenting the context of the disclosure. Work of the presently named inventor, to the extent it is described in the background section, as well as aspects of the description which may not otherwise qualify as prior art at the time of filing, are neither expressly or impliedly admitted as prior art against the present disclosure.

It is sometimes necessary for a user to show personal identification (such as a passport, driving license or the like) when accessing a service. This is necessary to help reduce the risk of use of the service for undesirable activity (such as fraud or other criminal activity) or to help track down the user in the case of non-payment for the service, for example. There are many examples of services which require a user to show personal identification (personal ID), e.g., banking and financial services, hotels, vehicle hire and the like.

Traditionally, personal ID such as passports, driving licenses or the like are in the form of physical documents which a user shows to a provider of the service. Such a document is visually inspected by the service provider (e.g., an employee) in order to verify the user's identity. A problem with this approach, however, is that it is possible for counterfeit versions of such physical documents to be used. Such counterfeit versions may not be recognized by the service provider. Furthermore, if the service provider is careless or corrupt, then they may allow a counterfeit ID document to be used even if they suspect that the document is not legitimate.

A solution to this problem is for details of an ID document (e.g., name, date of birth, document number and the like) to be stored electronically on a database. The database is accessible only to the organization (Identity Management Organization (IMO), e.g., official passport office or driving license authority) issuing the ID document and therefore there is a high level of certainty that the details held on the database are genuine. A service provider may therefore contact the IMO and provide details of an ID document presented to them by a customer in order to verify that the details provided in the ID document are genuine.

However, such identity checks increasingly need to be integrated into other functions of the service (such as checking a payer or payee's identity as part of processing a payment). In such cases, the myriad types of ID document, and high volume of requests make it impractical (e.g., for processing performance reasons) for the service to keep requesting the respective IMOs to validate identity documents. It is however not desirable (e.g., in order to preserve personal identity information) for all such services to hold complete identity information on all potential users.

ID verification services (IVSs) exist to solve this problem by acting as a proxy for the IMOs, solely to perform ID verification. Services can query the IVS instead of the IMO. The IVS is set up to provide a rapid verification response over a wide range of identity queries and removes from the IMO the need to service most such requests.

A problem is how to keep the personal information held by IVSs secure, especially in the case that the IVS is hosted by a shared ledger network (in which case the IVS's database is either publicly visible, or at least widely distributed (and so visible) across that shared ledger network).

BRIEF SUMMARY

The present disclosure is defined by the claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 1A to 1D schematically show information processing apparatuses according to embodiments;

FIGS. 4A to 4D schematically show example information used in embodiments;

DETAILED DESCRIPTION

Figure 2A:
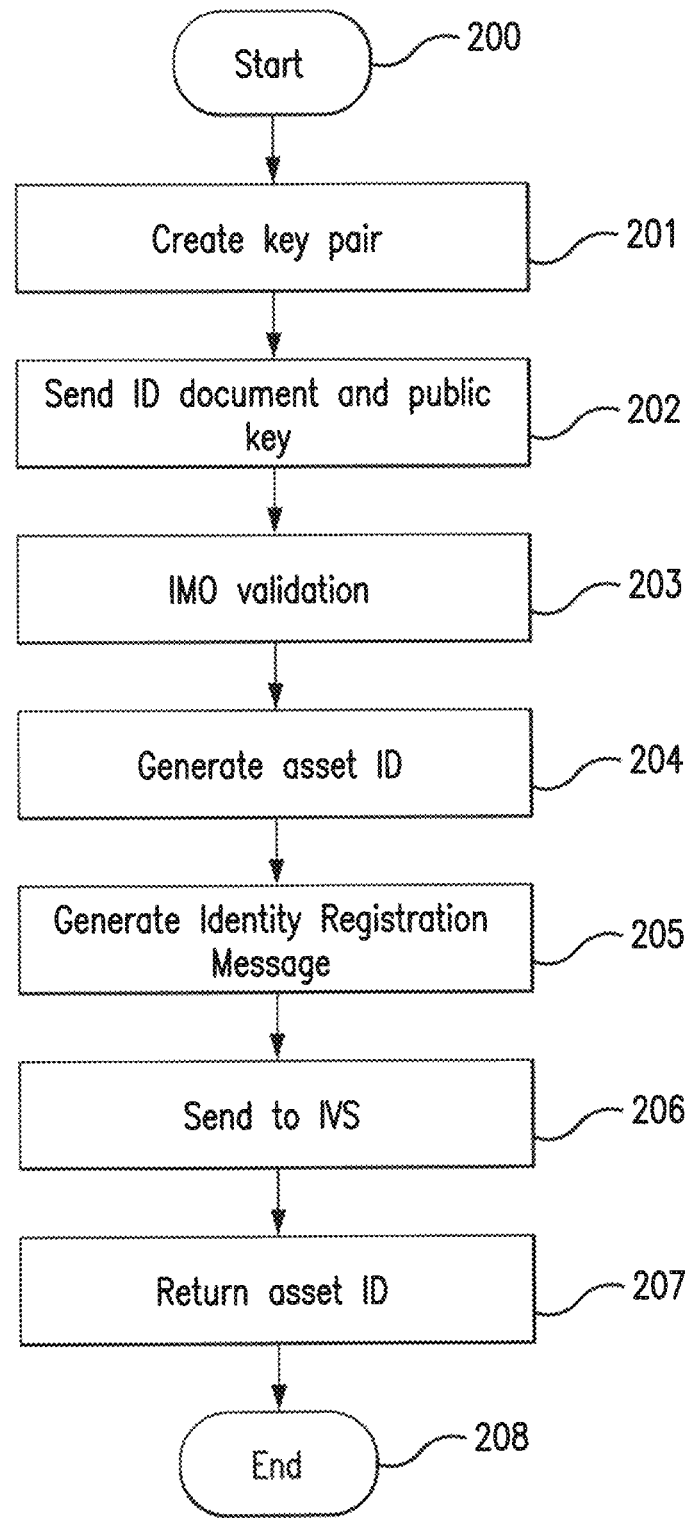
FIGS. 2A and 2B schematically show an identity registration method according to an embodiment.

Referring now to the drawings, wherein like reference numerals designate identical or corresponding parts throughout the several views.

In embodiments of the present disclosure, end users are able to register existing identity documents (such as passports, driving licenses or the like), via the organization (IMO) that issued these documents, with an Identity Verification Service (IVS) along with a public key. End users can then make identity claims to other users and/or organizations along with a digital signature created using the corresponding private key, which the user keeps. The user/organization receiving the claim can then verify it by referring it to an IVS which can then check the claim is valid by finding it in its ID database, and further verify the claimant using the digital signature. Various security elements may also be implemented to avoid personation and exposure of personal information.

FIGS. 1A to 1D show, respectively, a first information processing device 100 for use by an end user (customer), a second information processing device 105 for use by a service provider, a third information processing device 110 for use by an Identity Verification Service (IVS) and a fourth information processing device 115 for use by an Identity Management Organization (IMO). In this example, the ID database of the third information processing device 110 is in the form of a shared ledger.

The first information processing device 100 comprises a communication interface 101 for sending electronic information to and/or receiving electronic information from one or more of the other information processing devices, a processor 102 for processing electronic instructions, a memory 103 for storing the electronic instructions to be processed and input and output data associated with the electronic instructions and a storage medium 104 (e.g., in the form of a hard disk drive, solid state drive, tape drive or the like) for long term storage of electronic information. Each of the communication interface 101, processor 102 and memory 103 are implemented using appropriate circuitry, for example. The processor 102 controls the operation of each of the communication interface 101, memory 103 and storage medium 104.

The second information processing device 105 comprises a communication interface 106 for sending electronic information to and/or receiving electronic information from one or more of the other information processing devices, a processor 107 for processing electronic instructions, a memory 108 for storing the electronic instructions to be processed and input and output data associated with the electronic instructions and a storage medium 109 (e.g., in the form of a hard disk drive, solid state drive, tape drive or the like) for long term storage of electronic information. Each of the communication interface 106, processor 107 and memory 108 are implemented using appropriate circuitry, for example. The processor 107 controls the operation of each of the communication interface 106, memory 108 and storage medium 109.

The third information processing device 110 comprises a communication interface 111 for sending electronic information to and/or receiving electronic information from one or more of the other information processing devices, a processor 112 for processing electronic instructions, a memory 113 for storing the electronic instructions to be processed and input and output data associated with the electronic instructions and a storage medium 114 (e.g., in the form of a hard disk drive, solid state drive, tape drive or the like) for long term storage of electronic information. The ID database is stored in the storage medium 114. In the case that the ID database is in the form of a shared ledger, the ID database stored in the storage medium 114 is one of a plurality of copies the ID database, the other copies being stored by other information processing apparatuses on a network. Changes to one copy of the ID database are synchronized with all other copies of the ID database via a suitable consensus model. The concept of a shared ledger is known in the art and will therefore not be described in detail here. Each of the communication interface 111, processor 112 and memory 113 are implemented using appropriate circuitry, for example. The processor 112 controls the operation of each of the communication interface 111, memory 113 and storage medium 114.

The fourth information processing device 115 comprises a communication interface 116 for sending electronic information to and/or receiving electronic information from one or more of the other information processing devices, a processor 117 for processing electronic instructions, a memory 118 for storing the electronic instructions to be processed and input and output data associated with the electronic instructions and a storage medium 119 (e.g., in the form of a hard disk drive, solid state drive, tape drive or the like) for long term storage of electronic information. Each of the communication interface 116, processor 117 and memory 118 are implemented using appropriate circuitry, for example. The processor 117 controls the operation of each of the communication interface 116, memory 118 and storage medium 119.

The Identity Management Organization (IMO) is an organization such as the UK Passports Office that issues identity documentation.

In an embodiment, the Identity Verification Service (IVS) is a service provided by a separate organization that is able to verify identity claims with reference to its own identity database (ID database). These claims are forwarded from end users by services wishing to verify them.

In an embodiment, end users (including organizations), having been issued identity documentation from an IMO, may request that IMO to register that documentation with an IVS on its associated shared ledger.

The IMO is responsible for verifying that it issued the end user with the documentation that the end user wishes to register. Each IMO will have its own means of performing this verification (e.g., an official passport office will be able to perform the necessary checks to determine whether a passport it is supposed to have issued is genuine). Once verified, the IMO makes a request to the IVS to register the ID document on the shared ledger.

In an embodiment, the identity documentation is mapped into the following ontology:

A recognized document type (e.g., UK passport) that the IMO has registered with the IVS and is also stored on its shared ledger.

A document identifier (document ID), unique for that type of document (e.g., a document ID for a UK passport will be unique for that UK passport amongst all other UK passports).

A list of fields, each being a (key, value) pair.
The keys are made up of a domain part and a key name part (e.g., in the form "domain.name").
The IMO may register a domain for their document type to hold characteristics of their documents on the ledger, e.g., a domain of "UKPassport" for UK passports.
Standard domains (applicable to more than one type of document) are used for identity management, e.g., a domain of "Person".
So a passport might have the following fields, as (key, value):
(UKPassport.DocumentId, P7123766E)
(UKPassport.IssueDate, 2001-05-01)
(Person.FirstName, Fred)
(Person.LastName, Flintstone)

An example registration procedure is now described.

Document information is 'personal information' and is stored securely with the IMO in a regular database, private to the IMO. In an embodiment, should the end user wish to register this information with an IVS on its shared ledger, the following steps are progressed.

The end user creates a key pair (the identity key pair) comprising a public key and a private key (the identity public key and the identity private key, respectively) and stores the private key securely.

The end user requests the appropriate IMO to register the identity document, by sending the following:
The identity document details, or a reference (e.g., the Document ID) to these.
The identity public key from the created key pair.

The IMO validates and verifies the end user is the owner of the document using a suitable technique specific to the IMO (as previously discussed), that IMO having previously issued that document to that user.

The IMO then creates a unique string for the document, called the Asset ID, such that:

The string is unique to that type of document (e.g., an Asset ID for a UK passport will be unique for that UK passport amongst all other UK passports).

When combined with the Asset ID and then hashed, each field value in the document's fields will also be unique for its respective field key for that document type (e.g., the field value "Fred" for field key "Person.FirstName" combined with the Asset ID and then hashed will be unique for the field key "Person.FirstName" for all UK passports). The result of this hash function may be called the "encoded value" of that document's field.

The IMO then creates an identity registration record for each field in the document, which includes:

The document type (e.g., "UK passport").

The field key (e.g., "Person.FirstName").

The encoded value, created (as outlined above) by combining the field value with the Asset ID and then hashing the result (e.g., HF [Fred+Asset ID], where HF denotes a suitable Hash Function, and where + denotes a suitable combinatorial function (such as string concatenation)).

The end user's identity public key from the identity key pair.

An example of a set of identity registration records for the example fields mentioned above is show in FIG. 4A. Here, the end user's identity public key is denoted 'X'.

The IMO sends this information in the form of an identity registration message to the IVS, which stores the information on the shared ledger. The shared ledger is able to act as a repository for such identity registration records holding each of them in the form of an identity repository record which has, for each document field:

document type;
field key;
HF [field value+Asset ID]); and
end user's identity public key.

Thus, each identity repository record in this example has the same format to its corresponding identity registration record sent by the IMO to the IVS (as exemplified in FIG. 4A).

It is noted that the identity repository records (e.g., in the form exemplified in FIG. 4A) may be stored in a conventional database (e.g., secure database managed by the IVS) instead of on a shared ledger.

As an alternative to storing the identity repository records on a shared ledger (or in a conventional database) in the form as exemplified in FIG. 4A, the document type, field key, and hash value derived from the field value may instead all form part of a composite key in a table used to look up the identity public key (the identity public key also being part of this table). An example of such a table for the identity registration records exemplified in FIG. 4A is shown in FIG. 4B. This is an efficient way to store the identity repository records in a relational database.

The IMO returns the document's Asset ID to the end user.

The identity claim is verified using the identity key pair. An end-user A and the IVS are both able to generate a common instance of identity claim data which is specific to each identity claim by the end user. The identity claim data may be in the form of a data string, for example. The identity data is signed by A using the identity private key to create an 'identity signature'. The IVS verifies the identity claim by verifying this identity signature against the identity claim data using the corresponding identity public key. The public key for the document is stored on the shared ledger (or conventional database) (e.g., 'X' in FIGS. 4A and 4B)).

An example identity claim procedure is now described.

In an embodiment, following registration, an end user/organization, A, may claim their identity to another end user/organization, B, as follows:

A and B communicate and establish a unique, secure communication channel between them. For example, A may open an HTTP connection with B. In this example, within the created secure channel, A requests a session with B and B grants this returning to A the public key (the session public key) from a public/private key pair (the session key pair) B creates specifically for this session. B's session key pair need be valid only for the session used by A for transmitting an identity claim message to B.

B associates the channel with the end user (A) wishing to verify their identity. In this way B can be assured that, following a successful identity claim by A within this channel, this established identity is then valid for the rest of the duration of the established channel. The channel can then be used to conduct whatever business case required the identity verification, for example, opening a bank account, or making a payment.

A creates an 'identity token', for example, by concatenating the above-mentioned elements HF [field value+Asset ID] in a predetermined order and encrypting the result using B's public session key that B created and passed to A. A then creates the identity claim data, which comprises the identity token. In this example, the identity claim data consists of the identity token.

A then sends to B an identity claim message within the established session. To do this, A sends B an identity claim message in which A claims to have been issued a valid identity document. This identity claim message includes:

The document type (e.g., UK passport)

The document's Asset ID (as provided by the IMO to A during the registration procedure)

A number of the document's fields (key and value)

The identity token.

A digital signature (the identity signature), generated by signing the identity claim data (which is, in this example, the same as the identity token) using the identity private key for this document.

An example of an identity claim message for the document of FIGS. 4A and 4B is shown in FIG. 4C.

B validates the identity claim message by first decrypting the identity token and checking that it is consistent with the information in the identity claim message used to generate the identity token. Thus, for example, B generates a concatenation of information from information in the identity claim message that A should have previously generated in order to generate the identity token (e.g., a concatenation of HF[field value+Asset ID] for each field in the identity claim message). The decrypted identity token received from A should match the concatenation of information generated by B if the identity claim message has been genuinely received from A.

The session key pair is valid only once. Thus, B discards the session key pair after the session with A in which the genuine claim is made has ended. Thus, any repeated claim (to be A) by any fraudulent third party during a new session will be invalid, since such claims would not use the appropriate public session key for the session in which they appear (rather, such a fraudulent claim would use the public session key of a previous session, which is no longer valid).

Once the identity claim message has been validated, B next creates an identity verification request message comprising:

The identity document type (e.g., UK passport).
For each field B wishes to verify, the field key, paired with field value's encoded value (e.g., HF[field value+Asset ID] for each field B wishes to verify, as computed by B by the field value and Asset ID included as information in the identity claim message).
The identity token.
The identity signature.

An example of an identity verification request message for the document of FIGS. 4A to 4C is shown in FIG. 4D. This request message is then sent to the IVS.

On receipt of the identity verification request message, the IVS uses its identity database to verify the original end user's (A's) identity claim. This involves looking up the information contained within the identity verification request message in the identity database and retrieving the public key of information for which there is a match. For example, if the IVS identity database is an identity record repository in the format exemplified in FIG. 4A, then each field in the request is searched for in the identity record repository. If the IVS identity database is an identity record repository in the format exemplified in FIG. 4B, then first the appropriate composite primary key is created from the document type, field key and HF [field value+Asset ID] of the required field. This composite primary key is then searched for in the identity record repository.

If any fields in the identity verification request message do not have identity repository records found for them, then the overall request to the IVS fails and a message is returned to B indicating that the claimed identity cannot be verified. In the example of FIG. 4A or 4B and FIG. 4D, there should be four matches, one for each of the fields "UKPassport.DocumentId", "UKPassport.IssueDate", "Person.FirstName" and "Person.Lastname", since each of these fields were included in the identity verification request message and there exists an entry in the identity record repository for each of these fields. For each match, the public key is retrieved from the identity record repository.

The IVS then checks that the public key retrieved for all fields identified in the identity verification request message is the same (in the example of FIG. 4A or 4B and FIG. 4D, the same public key 'X' is retrieved for all fields and therefore this check is passed). It then generates the identity claim data from information in the identity verification request message (in this example, this is simply the identity token). It then checks that this public key 'X' verifies the identity digital signature (included in the identity verification request message) of the identity claim data. If it does, then the IVS returns a message to B to indicate a successful identity verification. If it does not, then the identity verification fails and the IVS returns a message to B to indicate the identity verification has failed.

In general, for each identity claim, the claim's identity claim data (which is digitally signed by A to create the identity signature which is then verified by the IVS) is generated by both the end user A and the IVS and helps provide the final verification of the claimed identity by A. In embodiments, the identity claim data is generated solely using the identity token. In other embodiments, the identity claim data is generated using the identity token and other information to be included in the identity verification request message, as described below.

To summarize, the identity token is generated by the end user A, validated by B and passed to the IVS to allow it to generate the identity claim data. B's validation of the identity token allows B to ensure that A's claim truly comes from the same user A it has established a secure session with (i.e. that A is not replaying an identity claim in an attempt to personate another user). This is possible as B is able to interpret the contents of the identity token and relate it to A (and the secure session B has with A). Since the identity signature is also based on the identity token (via the identity claim data), a verification of that signature by the IVS will both prove the identity that A is claiming and prove that it is actually made by A to B.

Thus, for example, any attempt by A to send a valid identity token to B (by establishing a session with B) but to then replay a valid identity signature from another user will fail because the identity claim data used to originally generate the replayed identity signature (by the other user) will not match the identity claim data generated by the IVS (based upon the identity token included in the identify verification request message). The identity signature cannot therefore be successfully verified. Verification of an identity claim according to the present technique therefore relies on the identity information included in the identity claim message being true and also on the context of the secure session (i.e. the correct identity token) between the claimer (A) and the user/service to whom the claim is made (B).

The claimed identity information from the user A is included in the identity claim message and in the identity verification request message (included using the 'encoded value' form in the latter). In embodiments, communications bandwidth can be saved by not repeating this information (or encrypted or other lossless versions of it) within the identity token. The identity claim data is derived from the 'encoded form' (hashed form) of the identity information, therefore removing the need for the identity information to be duplicated in the identity token. In such embodiments, the identity token may therefore be a smaller string (since it doesn't need to include the all identity information). In one such embodiment, the identity token is, for example, a cryptographic digest of the identity information combined with some data provided by B during the initiation of the secure session. In another such embodiment, the identity token is a digital signature created by A from the identity information using a private key trusted by B to only be known by A and to which B holds the corresponding public key to allow B to verify the signature. In such embodiments, the user A computes the hashed version of the claimed personal information in order to create the identity claim data and signs the identity claim data to create the identity signature (which is then included in the identity claim message with the clear text ('unhashed') identity information). The IVS in such embodiments then receives the hashed version of the claimed identity information and so is also able to generate the identity claim data against which to verify the identity signature.

In embodiments, existing fields of the identity claim message contribute to the creation of the identity claim data. In this case, these existing fields must also be present in the identification verification request message to allow the IVS to create the identity claim data against which to verify the identity signature. For example, when a timestamp indicating when the identity claim message was created is used for the generation of the identity claim data, it allows B to validate the time the identity claim message was created. If this time is too far in the past relative to B receiving the identity claim message (according to B's system clock and a predetermined time limit), then B may reject the identity claim message on the basis that it is likely to be fraudulent.

This rejection takes place before B issues an identification verification request message to the IVS.

In general, in embodiments, the present disclosure provides a system for checking a user's identity. The system comprises the first information processing device 100, the second information processing device 105, the third information processing device 110 and the fourth information processing device 115. The first information processing device 100 is a user device such as a personal computer, smartphone, tablet computer or the like operated by an end user (e.g., customer), for example. The first information processing device 100 is operated by party 'A' in the above-mentioned examples. The second information processing device 105 is a personal computer, point of sale (POS) device or the like operated by a service provider, for example. The second information processing device 105 is operated by party 'B' in the above-mentioned examples. The third information processing device 110 is a computer operated by the IVS, which may be acting as a node of a shared ledger network, for example. The fourth information processing device 115 is a computer operated by the IMO, for example.

When an end user makes an identity claim to a service provider, the communication interface 101 of the first information processing device 100 transmits, to the communication interface 106 of the second information processing device 105, identification information of the user (e.g., one or more field key and field value combinations), a unique identifier uniquely associated with the user's identification information (e.g., Asset ID) and an identity digital signature generated using an identity private key (of an identity private key and identity public key pair associated with the user, in particular, with the user's identification information)) and a message (the identity claim data) generated using a previously determined hash of a portion of the user's identification information with the unique identifier associated with the user's identification information (e.g., HF [field value+Asset ID] for each field of the identification information of the user). The communication interface 101 transmits this information to the second information processing device 105 in the form of an identity claim message like that shown in FIG. 4C, for example.

The processor 107 of the second information processing device 105 generates the hash of the portion of the user's identification information combined with the unique identifier associated with the user's identification information. The communication interface 106 transmits the generated hash and the identity digital signature (received from the first information processing device 100) to the communication interface 111 of the third information processing device 110. The communication interface 106 transmits this information in the form of an identity verification request message like that shown in FIG. 4D, for example.

The processor 112 of the third information processing device 110 looks up the generated hash in a database (stored in the storage medium 114) relating the previously determined hash of the portion of the user's identification information combined with the unique identifier associated with the user's identification information with the identity public key of the identity private key and identity public key pair associated with the user. Records of the database have a format as shown in FIG. 4A or 4B, for example. The processor 112 forms the identity claim data from the hashed identity information and verifies the identity digital signature against this using the identity public key related to the generated hash in the database. Upon successful verification of the identity digital signature, the communication interface 111 transmits a response to communication interface 106 of the second information processing device 105 indicating the successful verification.

Thus, with the present technique, the service provider operating the second information processing device 105 is able to verify the end user's identity based on the identification information provided by the user without having to rely on an employee to check a physical identity document of the end user or to contact the IMO in order to check the validity of the identity information. At the same time, because only hashed versions of the user's identification information (e.g., in the form HF [field value+Asset ID] for each field of the identification information of the user) are stored on the third information processing device 110 (which may be in the form of a publicly accessible shared ledger, for example), the user's identification information is protected. Furthermore, the Asset ID is used as 'salt' to prevent the stored hashed values being used as the basis for any attempt to reverse the hashing function to recreate the personal information the hashes represent. The IVS is able to access the information stored on the third information processing device 110 and may therefore easily, efficiently and securely check the identity of a particular user in response to an identity claim message received by a service from that user. Input from the IMO during the identity checking procedure is not required and the processing of the identity claim message does not require human interaction (resulting in increased efficiency and a reduction in the risk of human error). At the same time, the identification information stored in the database on the third information processing device 110 is itself not accessible in any meaningful way to the service provider (or any other system that may gain access to it), thereby ensuring security of all end users' identification information.

In an embodiment, the communication interface 101 of the first information processing device 100 is configured to transmit an identity token to the communication interface 106 of the second information processing device 105 with the user's identification information, unique identifier associated with the user's identification information and identity digital signature. The identity token is generated using a session public key of a session private key and session public key pair associated with a temporary communication session between the first and second information processing devices. The processor 106 of the second information processing device 105 verifies the identity token and transmits the generated hash and the identity digital signature to the third information processing device only if the identity token is successfully verified. The identity claim message exemplified in FIG. 4C includes the identity token.

The use of the identity token during the identity claim process allows the personal information claimed by the first information processing device to be claimed only to the second information processing device since only the latter has the session private key to validate it. In an embodiment, the message (the identity claim data) used to generate the identity digital signature comprises the identity token. In this case, the information used by the first information processing device to generate the identity token may comprise the previously determined hash of the portion of the user's identification information with the unique identifier associated with the user's identification information (e.g., the concatenation of information which is encrypted using the session public key to generate the identity token comprises HF [field value+Asset ID] for each field of the identification information of the user which is to be verified). In this scenario, the message (i.e. the identity claim data) based on which the identity digital signature is generated need contain no further information (that is, it consists solely of the identity token), thereby reducing the message size and the amount of processing required in generating and verifying the digital signature. The second information processing device must therefore send both the identity token and the identity signature as part of the identity verification request message to the third information processing device in order that the latter may check the identity digital signature using the appropriate identity public key retrieved from the storage medium 114. Note that it is not necessary for the third information processing device to be able to interpret the identity token (which it cannot do as it lacks the session private key of the second information processing device). Rather, it simply needs to check that the appropriate identity public key verifies the identity signature of the identity claim data (which is the same as the identity token in this embodiment). Furthermore, since the identity token is generated using the session public key passed from the second information processing device to the first information processing device, on receipt of the identity claim message the second information processing device can be assured that message was generated in response to its provision of that session public key and therefore that the identity claim message has not been replayed by some third party attempting to personate the user/organization truly having the identity being claimed.

In an embodiment, the previously determined hash of the portion of the user's identification information combined with the unique identifier associated with the user's identification information and the related identity public key of the identity private key and identity public key pair associated with the user are added to the database of the third information processing apparatus 110 during a registration procedure.

During the registration procedure (in which a user of the first information processing device 100 decides to register their details on the database in the storage medium 114 of the third information processing device 110 in order to make claiming their identity to service providers easier), the processor 102 of the first information processing device generates the identity private key and identity public key pair associated with the user (or, more particularly, to the user identification information the user plans to register). The communication interface 101 transmits the identity public key and user's identification information to the fourth information processing device 115.

Upon successful completion of an identity checking procedure for checking validity of the user's identification information (in accordance with the IMO's own procedures), the processor 117 of the fourth information processing device 115 generates the unique identifier associated with the user's identification information. It then determines the hash of the portion of the user's identification information combined with the unique identifier associated with the user's identification information. The communication interface 116 transmits the hash of the portion of the user's identification information combined with the unique identifier associated with the user's identification information and the identity public key to the communication interface 111 of the third information processing device 110. The communication interface 116 transmits this information in the form of a set of identity registration records like that shown in FIG. 4A, for example. The communication interface 116 then transmits the unique identifier associated with the user's identification information to the communication interface 101 of the first information processing device 100.

The processor 112 of the third information processing device 110 adds the received hash of the portion of the user's identification information combined with the unique identifier associated with the user's identification information and the identity public key to the database stored in the storage medium 114 (the database having records (identity repository records) in the format shown in FIG. 4A or 4B, for example).

The end user is thus able to register identification information verified by the IMO who issued the identification information on the IVS's database, thus making it easy, efficient and secure for the user's identity to be checked when they attempt to access a particular service. At the same time, because no identification information of the user (which may be sensitive information such as the user's name, address, date of birth and the like) is stored in plaintext form in the database (it is only held in hashed form), the user's identification information remains secure. In an embodiment, the database is a shared ledger, as previously discussed. Furthermore, since the hashed form of the identity information is a hash after combination with an additional unique identifier (e.g., in the form of the Asset ID), this hashed form is resistant to reversal (repeated attempts to find the original plain text identity information that would have created the stored hashed value). This is because the hashing would need to try possible values for the identity information (which may be known or guessed, and of potentially limited range) after combination with an identifier (which is completely unknown, and of considerably greater range). The reversal process is thus rendered computationally unfeasible, thereby making the personal information held in the IMO information storage device 119 safe from discovery based on the hashed stored version of this personal information held in the IVS information storage medium 114.

Figure 2B:
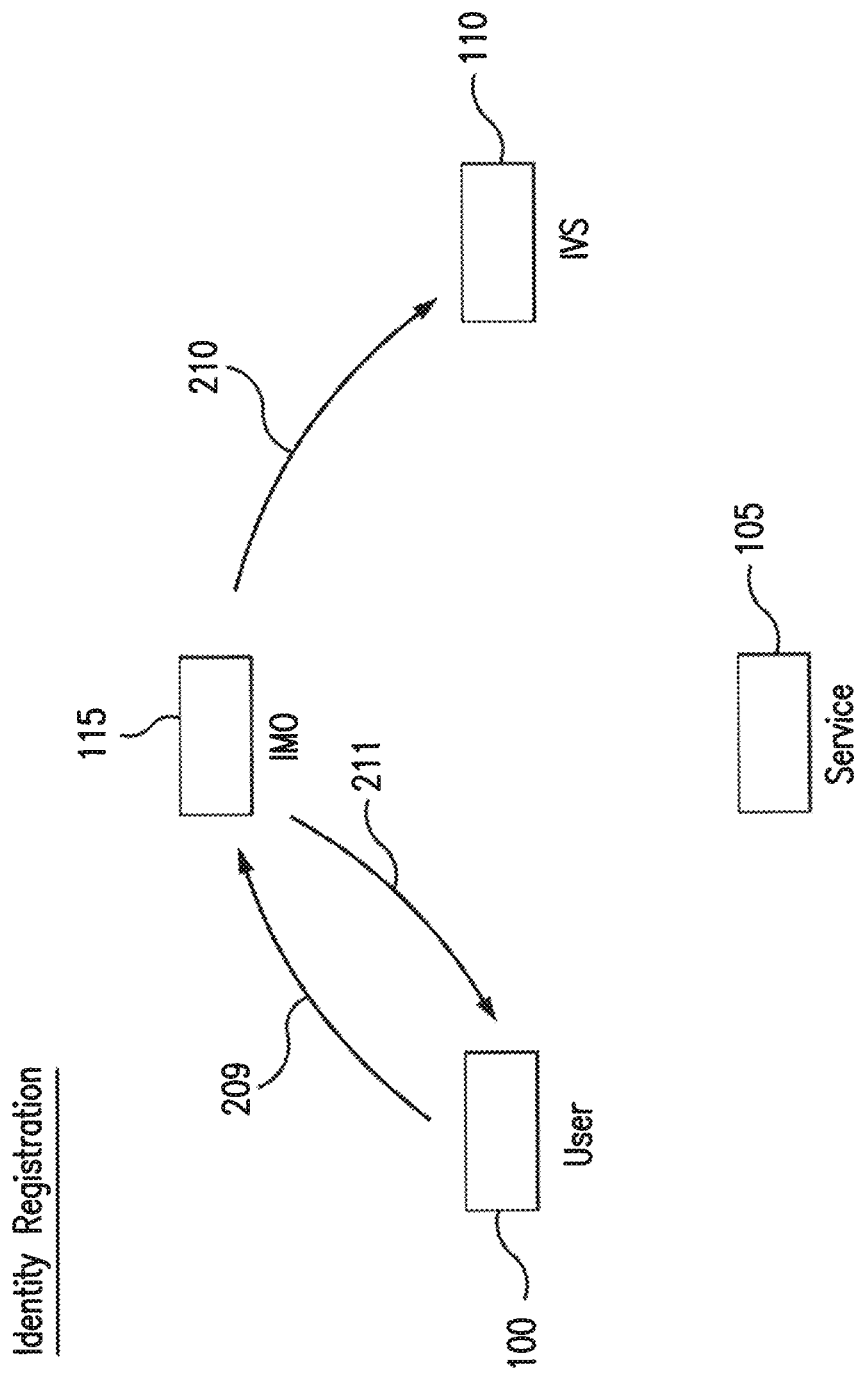

FIGS. 2A and 2B illustrate the registration process, according to an embodiment. The process starts at step 200. At step 201, the identity private key and identity public key pair (for generating/verifying the identity digital signature) are generated. At step 202, the end user sends their identification information to the IMO for validation and verification by the IMO. This involves, for example, the user sending their physical ID document (as issued by the IMO) to the IMO, visiting an IMO premises in order to show their physical ID document in person or any other suitable checking procedure implemented by the IMO. The user also provides the generated identity public key to the IMO. The transfer of the identification information and identity public key from the user to the IMO is shown as arrow 209 in FIG. 2B. At step 203, the IMO validates and verifies the identification information. Upon successful validation and verification of the identification information, at step 204, the IMO generates an Asset ID for the identification information. At step 205, the IMO generates an identity registration request message comprising a set of identity registration records (like those shown in FIG. 4A, for example). Each identity registration record comprises respective identification information in which a portion of the identification information has been hashed with the user's Asset ID. In the example of FIG. 4A, in which each identity registration record comprises a field with a field key and field value as the identification information, the hashed portion of the identification information is the hashed field value. At step 206, the identity registration request message is sent to the IVS. The transfer of the identity registration request message from the IMO to the IVS is shown as arrow 210 in FIG. 2B. Upon successful addition of the identify registration records to the shared ledger (so the shared ledger comprises rows like that shown in FIG. 4A or 4B, for example), at step 207, the IMO returns the Asset ID to the user. The transfer of the Asset ID from the IMO to the user is shown as arrow 211 in FIG. 2B. The process ends at step 208.

Figure 3A:
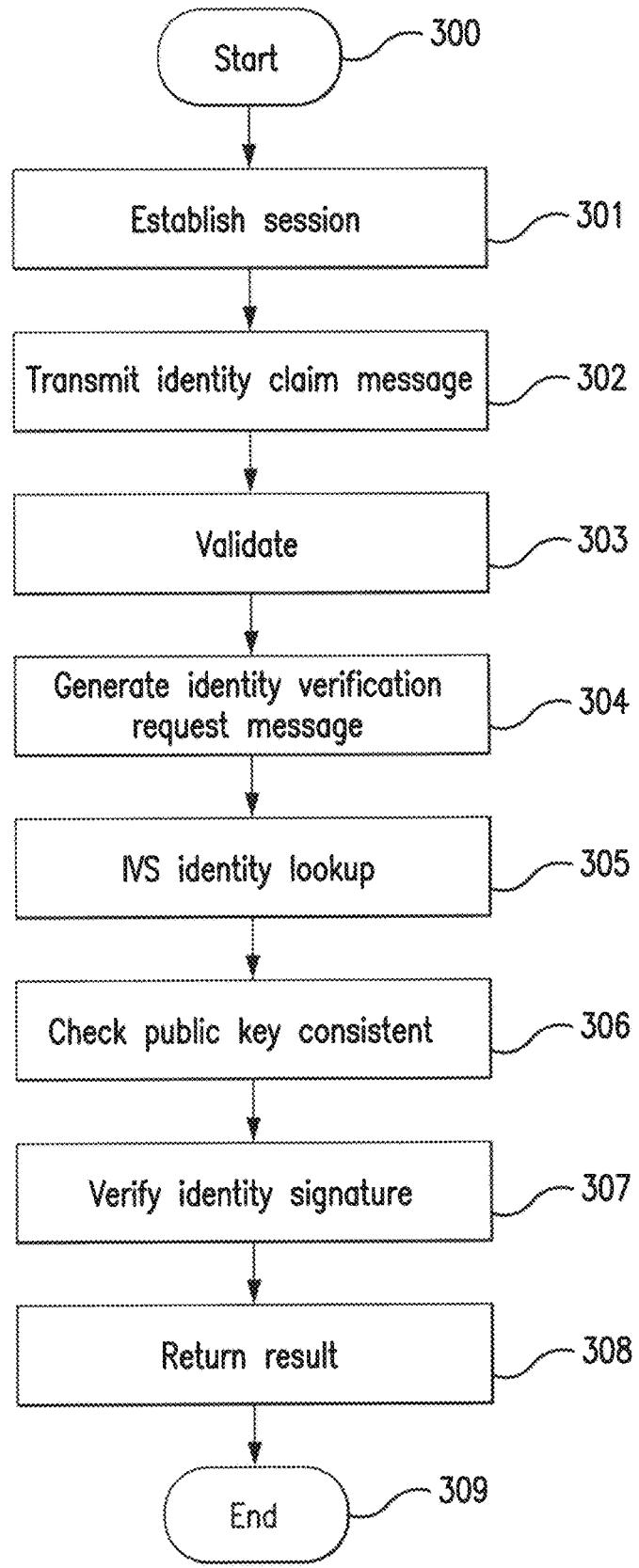
FIGS. 3A and 3B schematically show an identity verification method according to an embodiment.
Figure 3B:
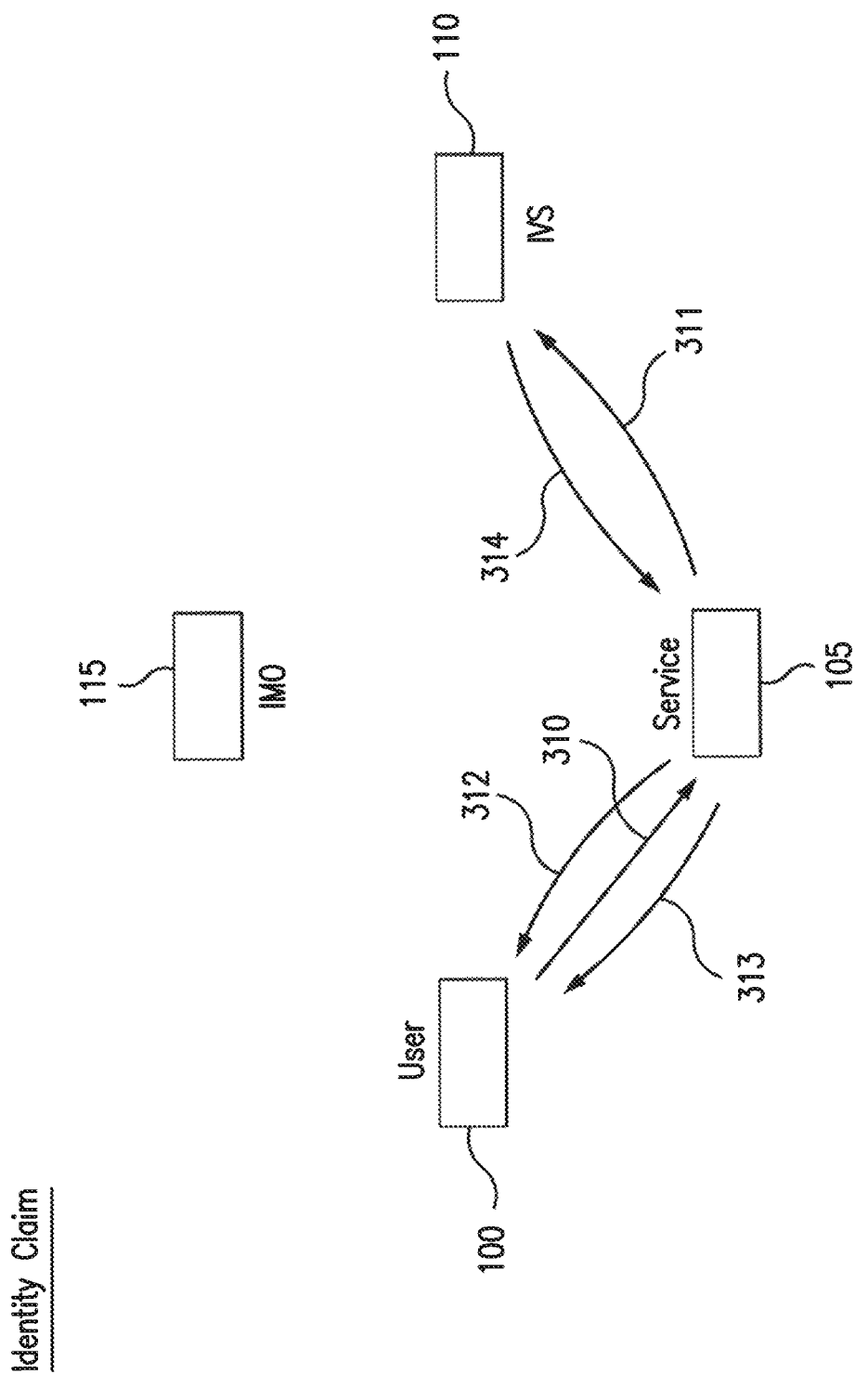

FIGS. 3A and 3B illustrate the identity claim process, according to an embodiment.

The process starts at step 300. At step 301, a secure communication channel is established between the user and the service and within that a temporary session is established between the user and the service. The secure communication channel protects the personal identity information transferred during the subsequent identity claim.

The establishment of the temporary session may involve, for example, the service generating a session private key and session public key and transmitting the session public key to the user (this transfer of the session public key is show as arrow 312 in FIG. 3B). The session public key and session private key are then used, respectively, for generation and verification of the identity token.

At step 302, in order for the user to claim their identity to the service (e.g., if the service is a bank, as the user is opening a bank account or, if the service is a car hire service, as the user is hiring a car), the user transmits an identity claim message (like that shown in FIG. 4C, for example) to the service. The identity claim message comprises identification information of the user that the user wishes to prove to the service and its associated Asset ID. The transfer of the identity claim message from the user to the service is shown as arrow 310 in FIG. 3B. At step 303, the service validates the identity claim message. The validating includes verifying the identity token using the session private key. Upon successful validation of the identity claim message, at step 304, the service generates an identity verification request message (like that shown in FIG. 4D, for example) and transmits this to the IVS. The transfer of the identity verification request message from the service to IVS is shown as arrow 311 in FIG. 3B. The identity verification request message comprises the identification information that the service wishes to verify, but with the relevant portion of each instance of identification information having been hashed after combination with the identity information's Asset ID. At step 305, the identification information comprised within the identity verification request message is looked up by the IVS in the shared ledger. The identity public key of each row of the shared ledger for which there is a match with the identification information is retrieved. At step 306, it is determined whether the retrieved identity public keys are consistent (that is, the same identity public key is retrieved for each instance of identification information). In the example identity record repositories of FIG. 4A or 4B, upon receiving the identity verification request message shown in FIG. 4D, the same identity public key 'X' should be retrieved for each field comprised within the identity verification request message, for example. Upon successful validation that the identity public key is consistent, at step 307, the identity digital signature is verified using the retrieved identity public key for the identity claim data generated from the identity verification request message. Upon successful verification of the identity digital signature, at step 308, the IVS returns a response to the service indicating that the identity digital signature has been verified and that the identification information provided by the user is valid. The transfer of the response from the shared ledger to the service is shown as arrow 314 in FIG. 3B. The user's interaction with the service can therefore be completed (e.g., if the service is a bank, then the user's bank account may be opened or, if the service is a car hire service, then the user may be allowed to hire the car). The response from the service to the user is that their identification has been verified and that the business case may then continue within the secure channel is shown as arrow 313 in FIG. 3B. The process then ends at step 309.

In FIGS. 2A and 2B and FIGS. 3A and 3B, it will be appreciated that actions carried out by each of the "user", "service", "IVS" and "IMO" are actually carried out by the first, second, third and fourth information processing devices, respectively.

In the example above, a service (party 'B') may require multiple identity documents (e.g., UK passport and UK driving license) with possibly overlapping field keys (e.g., both a UK passport and a UK driving license will have "Person.FirstName" and "Person.LastName" fields) to build up an Identity Profile of the user (party 'A'). This requirement can be defined by an identity template made available to A by B. The identity template comprises:

A set of accepted document types (e.g., UK passport, UK driving license, European Union Identity Card, etc.).

A set of fields that B wishes to confirm (e.g., "Person.FirstName", "Person.LastName", "UKPassport.DocumentId", etc.).

For each required field, the number of separate sources for this field (e.g., "Person.FirstName"=2 sources, "Person.LastName"=2 sources, "UKPassport.DocumentId"=1 source, etc.).

Other criteria that B requires.

When an identity template is used, the user A will make multiple identity claims (that is, send multiple identity claim messages), once with each document, until B has verified enough information to generate the identity profile of A. After the identity claim message associated with each document has been successfully processed, the number of remaining required sources for each field in the identity template (or, more generally, each type of identification information, the type of identification information when the identification information is in field form being the field key) which has been verified using that identity claim message is reduced by 1. Once the number of remaining required sources for each field in the identity template has been reduced to 0, then it is known that the identity profile of A has been confirmed (assuming any other criteria required by B have also been met at this point). B makes its Identity Template available to A in advance so that A knows what documentation to submit. B will reject any attempt by A to submit the same identity document for a given type of identification information more than once for contribution to the same Identity Profile.

The identity verification scheme of embodiments can be used in parallel with other identity verification schemes for some or all of the identity verification process.

In embodiments, the use of a common field key taxonomy (e.g., "Person.FirstName", "Person.FirstName", etc. are common to a plurality of types of identification document) makes it possible to combine the identity information from multiple sources in this way. B will need to ensure appropriately that the field value for the same field key in each document A submits to it is the same.

More concrete examples of the use of an identity template with a service is now given. In this example, 4 identity documents are required to complete the service's identity template requirement.

In a first example, an end user opens a secure communications channel with the service. The service provides a session public key (or other information) to open the session.

The user then provides an identity claim request message for each of the documents it wishes to claim, 4 messages in all. The identity token for each of these messages will use the provided session public key (or other information). Each message will contain a separate respective identity signature. The service will transmit a respective identity verification request message to the IVS for each of these identity claim messages. If the IVS identity check is passed for each of the 4 documents, then the service will keep open the secure channel and allows the user access to the business functionally protected by the identity check.

In a second example, the end user first creates an 'account' which is identified with a username with the service. The service and the user each create 'account' key pairs and exchange their public keys. The service then uses the user's account public key to validate signatures in messages from the user to the service from then on. Likewise, the user can use the service's account public key to encrypt information to the service and so prove that that information was sent specific to the account dialogue between that user and service. This account dialogue is therefore the 'session', existing over a number of identity claims.

The user then transmits a series of identity claim messages to the service (in this case, 4 identity claim messages are sent, one for each identity document). Each of these is transmitted over a respective a secure communications channel that exists solely for the length of that claim. The identity token in each comprises a digital signature (created with the user's account private key) of information including a timestamp of the claim message and the account username (after it has been encrypted with the service account public key). The identity signature for each identity claim message is created with the identity private key for each respective document.

Each identity claim message then allows the service to build up a picture (the user profile) of verified documents against the username until enough verified documents are collected to complete the identity template for the service. All business case usage of the service by the user is subject to the user's username being associated by the service with a completed user profile according to the service's identity template. Attempts by the user to invoke service functionality (beyond submission of identity claims) before an identity template is complete result in an error message from the service indicating that permission is denied for this reason.

In this case, the identity token for each transmitted identity claim message is different due to being a digital signature of the identity claim message including a timestamp. This allows the service to reject a received identity claim message if the timestamp (validated by the digital signature as the identity token) indicates that more than a predetermined amount of time has passed since the message was timestamped and the current time. Each temporary communication session between the user and service is thus temporally defined as being between the time indicated by the timestamp of an identity claim message and the time at which the predetermined amount of time (starting from the time indicated by the timestamp) expires.

There are many applications of embodiments of the present disclosure (scheme).

In one example application, the scheme allows end users to complete KYC (Know Your Customer) registration with organizations. Examples would include Financial Service Providers such as banks (as previously mentioned).

In another example application, the scheme allows 'smart contract' services (that is, services using contracts implemented automatically using computer code) to be associated with a number of specific roles. End users are able to register with these contracts and apply to interact with the contract under one or more of these roles. Contracts may use an identity template for this purpose, for example (with different roles requiring different identity templates to be fulfilled).

In embodiments, it is possible for an end user to interact directly with the shared ledger network rather than via a service. For example, with smart contracts implemented via the shared ledger network, the user themselves (or, more specifically, the first information processing device 100) creates the identify verification request message (e.g., as shown in FIG. 4D) as part of the role application to the contract. That is, the end user does not create an identity claim message (e.g., as shown in FIG. 4C) for a service to then generate an identity verification request message, but generates the identify verification request message directly. Because the identity verification request message comprises a portion of the identification information of the user in hashed form, this avoids the need for the plaintext identification information (which may be sensitive information of the user) to be sent to the shared ledger network. The specifics of the actual users that join the contract are programmed into the contract's identity template when the contract is submitted to the shared ledger network. If specific field values are required, these are stored in their encoded value form with the contract so that the contract can check these values without needing to know (on the shared ledger network) what this personal information actually is.

In another example application, a party 'A' (e.g., an end user) may make an identity claim to a party 'B' (e.g., a service). B may use this identity claim as a predate clause in a payment to A. This means that the payment is subject to the identity claim made by A being successfully verified. This allows A and B to create a temporary session, A to make a claim to B, and B to pay A only if the identity claim made by A to B is successful. The arrangement may be enforced by a banking network or shared ledger network enabling payments. Upon a payment from B to A being instructed, A is requested to submit an identity claim message. Payment is then only completed by the banking network or shared ledger network in the event of successful verification of A's identity. If the payment is implemented by a bank, then the bank generates an identity verification request message (e.g., in the form of FIG. 4D) based on the identification information in an identity claim message (e.g., in the form of FIG. 4C) received by B from A. The bank then only completes the payment if the identity verification request message is successfully verified. If the payment is implemented by a shared ledger network, then the shared ledger network may require an identity verification request message to be received from B as part of the process of completing a shared ledger payment from B to A. In an embodiment, the request may be incorporated into the payment itself, thus allowing the processing of the payment and the verification of the source or destination of the payment's funds to be performed as one operation. The payment is only completed if the received identity verification request message(s) is (are) successfully verified.

In an example, such an arrangement may help two companies A and B (where B pays A for services) to avoid being victims of fraud in which a company pretending to be A sends an invoice to B. An impersonator of company A will not be able to generate an identity claim message resulting in successful verification of a subsequent identity verification request message, and therefore it will not be possible for B to pay the impersonator. In such an example, the IMO relevant may be the official register of companies in the territory concerned (e.g., Companies House in the UK) and the identity document used by A to generate the identity claim message would be the corporate registration document, for example.

To explain this example in more detail, the registered identity document might also be a company's registration at Company House (the IMO). In this case, the company sends a request for this this identity be registered with the IVS. Upon successful registration of the company at the IVS, the company may send an invoice to a payer requesting payment to a specific account number and include in that invoice an identity claim message. In this case, the payer acts as the service (since they are the entity to which the identity claim message is provided). The payer then creates a payment message and includes in the payment message a predicating identity verification request message created from the identity claim message. This payment message is then presented to a bank/shared ledger for processing.

The bank/shared ledger recognizes the predicating identity verification request message comprised within the received payment message and forwards the identity verification request message to the IVS before processing the payment. The payment is then only processed in the event that the IVS returns a positive verification response to the identity verification request message. In this way, only the verified identity owner is able to receive the payment.

In this example, the identity token is based on (in addition to previously described elements) details of the invoice (e.g., amount and the payment destination account) in a form that can be verified by the payer. This ensures that the identity claim is specific to the invoice presented. In this case, the payer may validate the identity token (validating that the identity claim covered the invoice particulars correctly), create the identity verification request message, send the identity verification request message to the IVS for verification and then send a regular payment message (not including the identity token, which has been verified and which is therefore no longer needed) to the bank/shared ledger for processing the payment. This allows the present technique to be implemented with existing payment processing systems.

In another example application, social media sites hold an identity (the public username, or "handle") for their end users. For example, an end user might have a certain Twitter® handle. The social media site may register as an IMO for the domain of its end user identities (e.g., domain of Twitter handles for Twitter) and such an end user may then register their user identity (e.g., their Twitter handle) via the IMO (the social media site itself). An end user may then identify themselves outside of the social media system by means of that registered identity (e.g., their social media handle).

To further explain this example, the above-mentioned embodiments relate to having a physical document (e.g., passport) and an associated IMO (e.g., passport office). However, in another embodiment, the present technique can be used to verify any claim previously approved by an authorized approver (who may then act as an IMO). For example, this includes other forms of identity such as a Twitter handle. A Twitter user may authenticate themselves with Twitter (e.g., by entering a correct username and password combination) and, following successful verification of their identity by Twitter, might request their Twitter handle to be registered with the IVS.

To do this they would create an identity key pair, send the identity public key to Twitter and ask for the identity to be registered. The identity registration system at Twitter would then progress as for a regular document, except that the document would be a virtual document with attributes as disclosed in Table 1:

TABLE 1

| Document Type: | Com.Twitter.Handle |
|---|---|
| Com.Twitter.DocumentID: | ID made up by Twitter.com, unique for that Twitter user |
| Com.Twitter.Username | @FredFlintstone |

The above-descripted procedure is then applied to this virtual document. In particular, an Asset ID is created and a hashed version of each field value (in this case, the field keys being "Com.Twitter.DocumentID" and "Com.Twitter.Username" and the field values being the ID made up by Twitter.com and "@FredFlintstone", respectively) is stored in a respective repository record stored in the IVS.

Twitter would then authenticate the request (in a manner specific to them, e.g., by verifying a username and password combination entered by the user) and, following successful authentication, transmit an identity registration message to the IVS to record the above-mentioned fields as identity repository records within the IVS database. After successful registration with the IVS, the user can then transmit identity claim messages to a third party (e.g., another service or another user) to prove that they are indeed @FredFlintstone in the domain Com.Twitter.Username.

In another example application, existing banks may act as IMOs in order to share the KYC identity information they have already collected and checked. This allows the present scheme to be introduced before traditional identity document issuers (e.g., passport offices, driving license authorities and the like) are registered as IMOs.

In another example application, apart from identity, other forms of claims can be verified using this scheme. For example, an academic qualification could be validated by the academic organization responsible for the academic qualification (e.g., a university) acting as an IMO. It will thus be appreciated that, more generally, embodiments of the present technique may be used to verify any information associated with a user, not just identity information.

In another example application, an end user may have a unique identity (such as a social media username, e.g., a Twitter handle) which is associated with a payment address (e.g., within a banking system or shared ledger network). An Account Management Organization (e.g., a bank) having responsibility for managing the administration of a user's accounts may act as a service in the above examples, and receive an identity claim message from one of its end users. The AMO may then request an Account Holding Entity (AHE, e.g., a bank, or payment network, or a shared ledger network processing payments) to associate the claimed identity with an account managed by the AHE. In this case the AHE would verify the identity claim (acting in this case as an IVS) and, upon successful verification of the identity, associate that identity with a payment address (e.g., account) under its control. An end user may then create a payment request using only this unique identity, in its hashed identity verification request format, providing improved ease of use to the user whilst maintaining additional security. When such a payment request is received it is mapped back to the account it is associated with. In an embodiment in which the payment address is within a shared ledger network and the identity record repository (comprising the hashed unique identity) is comprised within a shared ledger of the shared ledger network, a single request (containing the payment request and the identity verification request message) may be sent to the shared ledger network by the end user in order to perform the payment. It is noted that the association of the user's unique identity and their payment address is stored at a suitable location, e.g., within the banking system or within a shared ledger network for implementing payments, so as to enable any payments to take place following verification of the end user's identity.

To explain this example in more detail, a user registered with a bank might request the bank to associate that social media identity with one if their accounts. The bank would verify the identity by sending an identity verification request message to the IVS to check that the user actually has this identity. Alternatively, a user may have an account in the form of a position on a shared ledger hosted by a shared ledger network (in other words, the user is a party to the shared ledger). In this case, the user requests an Account Management Organization (AMO) with which they have a relationship to associate an account with the social media identity. The AMO does this by making a request to the shared ledger network to make the association with the identity (the identity being in hashed form, i.e. hashed with the Asset ID). The shared ledger network then either sends the hashed form of the identity in an identity verification request to the IVS or, alternatively, acts as the IVS itself and performs the lookup and verification of the identity prior to creating the identity/account association, which it performs with a separate request to the shared ledger network to create and record this association.

From this point forward, payments forwarded to the bank/ledger can have source account and/or destination account fields in terms of the hashed form of the social media handle provided. The bank/shared ledger can then look up the actual account and use the looked-up account in processing the payment.

FIGS. 5 to 8 show respective processes carried out by each of the first, second, third and fourth information processing devices 100, 105, 110 and 115, according to an embodiment. These embodiments relate to the verification of information associated with a user, of which identity information is an example.

Figure 5:
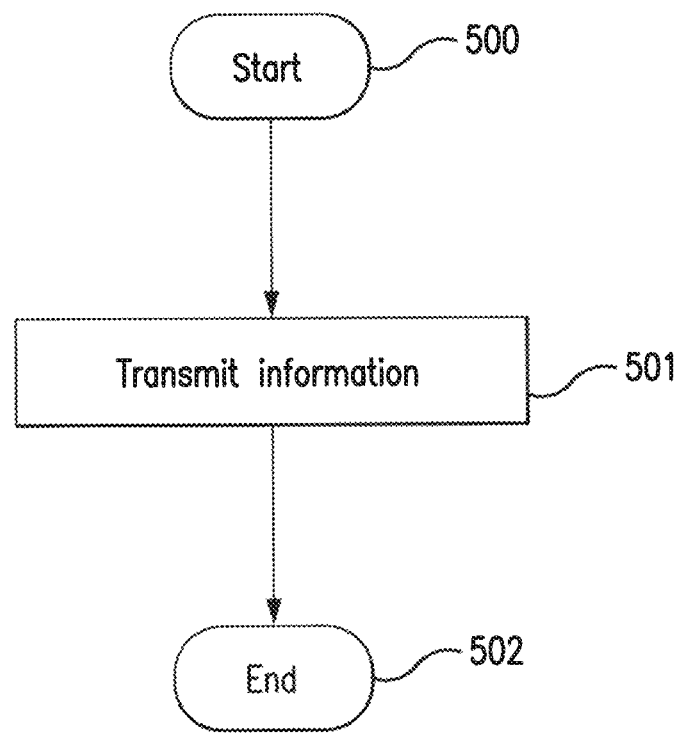
FIG. 5 schematically shows a process carried out by a first information processing apparatus, according to any embodiment.

FIG. 5 shows a process carried out by the first information processing device 100, according to an embodiment. The process starts at step 500. At step 501, the communication interface 101 transmits, to the communication interface 106 of the second information processing device 105, information associated with the user (e.g., field key and field value), a unique identifier (e.g., Asset ID) uniquely associated with the user associated information and an identity digital signature generated using an identity private key of an identity private key and identity public key pair associated with the user and a message (identity claim data) generated using a previously determined hash of a portion of the user associated information combined with the unique identifier associated with the user associated information (e.g., HF[field value+Asset ID]). The process ends at step 502.

Figure 6:
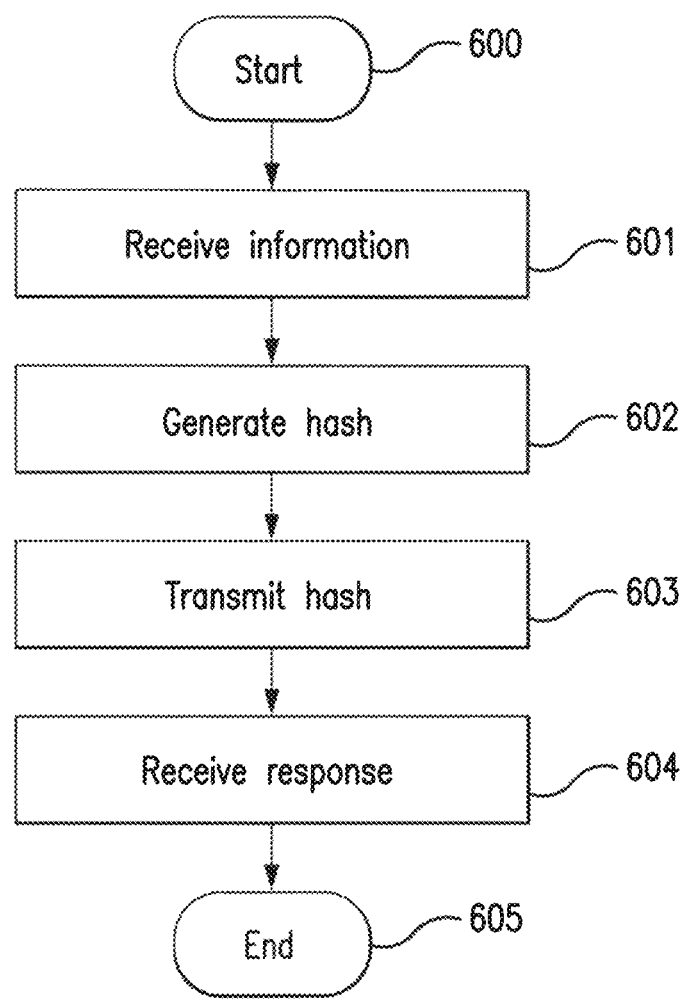
FIG. 6 schematically shows a process carried out by a second information processing apparatus, according to any embodiment.

FIG. 6 shows a process carried out by the second information processing device 105, according to an embodiment. The process starts at step 600. At step 601, the communication interface 106 receives, from the communication interface 101 of the first information processing device 100, the information associated with the user (e.g., field key and field value), the unique identifier (e.g., Asset ID) uniquely associated with the user associated information and the identity digital signature. At step 602, the processor 107 generates the hash of the portion of the user associated information combined with the unique identifier associated with the user associated information (e.g., HF[field value+Asset ID]). At step 603, the communication interface 106 transmits the generated hash and the identity digital signature to the communication interface 111 of the third information processing device 110. At step 604, upon successful verification of the identity digital signature by the third information processing device 110, the communication interface 106 receives a response from the third information processing device 110 indicating the successful verification. The process ends at step 605.

Figure 7:
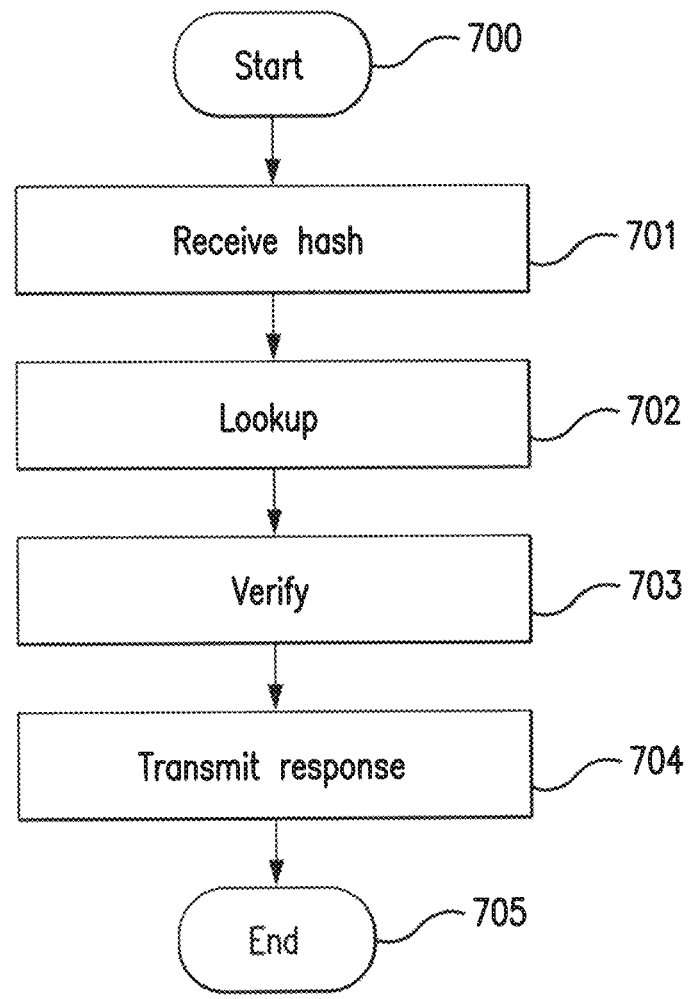
FIG. 7 schematically shows a process carried out by a third information processing apparatus, according to any embodiment.

FIG. 7 shows a process carried out by the third information processing device 110, according to an embodiment. The process starts at step 700. At step 701, the communication interface 111 receives, from the communication interface 106 of the second information processing device 105, the generated hash (e.g., HF[field value+Asset ID], as generated at step 602) and the identity digital signature. At step 702, the processor 112 looks up the generated hash in a database (stored in the storage medium 114) relating the previously determined hash of the portion of the user associated information combined with the unique identifier associated with the user associated information (e.g., HF[field value+Asset ID], as used for generating the identity digital signature at step 501) with the identity public key (e.g., 'X') of the identity private key and identity public key pair associated with the user's identity information. At step 703, the processor 112 verifies the identity digital signature using the identity public key related to the generated hash in the database. The identity digital signature is verified against the identity claim data generated from the identity verification request message. Upon successful verification of the identity digital signature, at step 704, the communication interface 111 transmits a response to the second information processing device 105 indicating the successful verification. The process ends at step 705.

Figure 8:
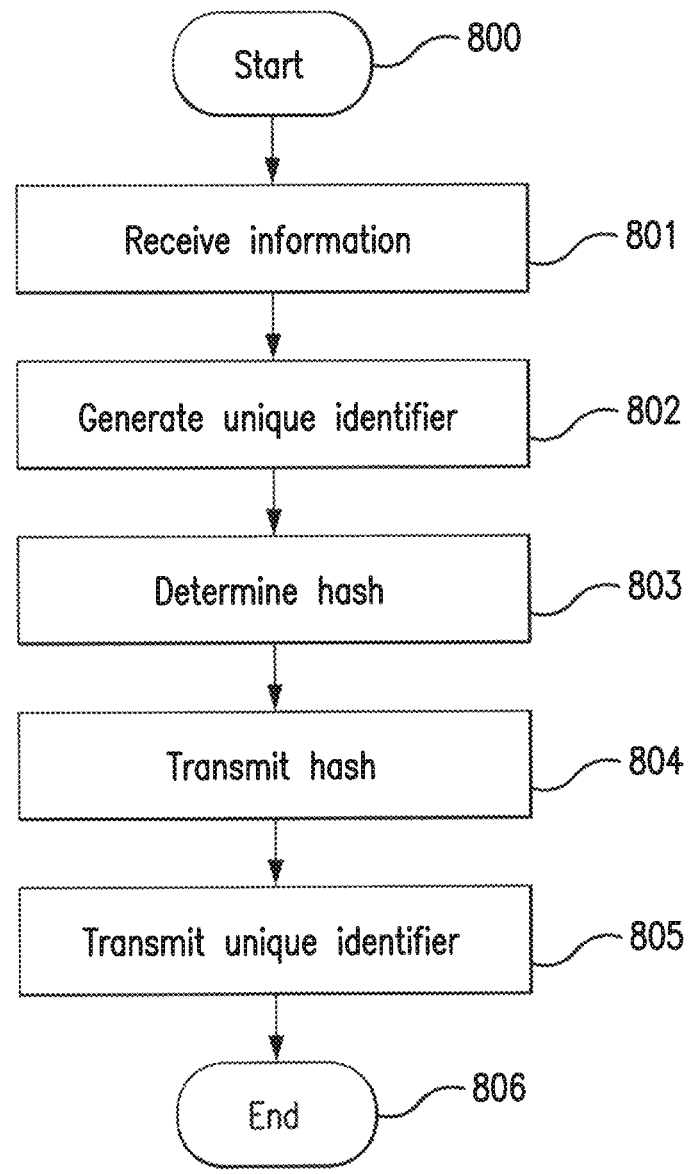
FIG. 8 schematically shows a process carried out by a fourth information processing apparatus, according to any embodiment.

FIG. 8 shows a process carried out by the fourth information processing device 115, according to an embodiment. The process of FIG. 8 is a registration process carried out before the processes of FIGS. 5 to 7. The process starts at step 800. At step 801, the communication interface 116 receives, from the communication interface 101 of the first information processing device 100, the identity public key (e.g., 'X') and user associated information (e.g., field key and field value). At step 802, upon successful completion of a checking procedure for checking the validity of the user associated information, the processor 117 generates the unique identifier (e.g., Asset ID) associated with the user associated information. At step 803, the processor 117 determines the hash of the portion of the user associated information combined with the unique identifier associated with the user associated information (e.g., HF[field value+Asset ID]). At step 804, the communication interface 116 transmits the hash of the portion of the user associated information combined with the unique identifier associated with the user associated information and the identity public key to the third information processing device 110. This allows the third information processing device to add the received hash of the portion of the user associated information combined with the unique identifier associated with the user associated information and the identity public key to the database. This is the hash looked up at step 702. At step 805, the communication interface 116 transmits the unique identifier associated with the user associated information to the first information processing device 100. The process ends at step 806.

In the above-mentioned embodiments, the identity record repository stored in storage medium 114 may be directly accessible by the IMO and/or service. This removes the need for a separate IVS service. In this case, the respective IVS functionality for registration and/or verification (as described above) is carried out by the fourth information processing device 115 (controlled by the IMO) and/or second information processing device 105 (controlled by the service) rather than the third information processing device 110 (controlled by the IVS). In other words, the second and/or fourth information processing devices 105 and 115 are configured to carry out the role of the third information processing device 110 as previously described.

In general, the identity token is something that A creates based on the user identification information (also known as identity information, ID information or user information) contained in the identity claim message and either something that B already trusts that A uniquely has (e.g., a private key secret to and unique to A) or something that B provides to A (e.g., a session public key or 'salt' for a hashing function) for the duration of the session in which A makes the identity claim to B. B is then able to either recreate the identity token from the claimed identity information (possibly plus other data) or to otherwise validate that the identity token correctly relates to the identity information being claimed. Because this recreation of the identity token or validation of the identity token depends on information (e.g., public or private key or 'salt' for hashing function) valid only for the session between A and B during which A claims its identity to B, the risk of a message from A being fraudulently replayed at a later time after the session has ended is alleviated (since the information on which the identity token depends is no longer valid and therefore the identity token can no longer be recreated or validated by B).

It is noted that the IVS has no interest in how the identity token is created. It is only for the IVS to verify the identity digital signature created by A and included in both the identity claim message (transmitted from A to B, e.g., as shown as arrow 310 in FIG. 3B) and the identity verification request message (transmitted from B to the IVS, e.g., as shown as arrow 311 in FIG. 3B). The IVS does not directly check the identity token (in fact, it cannot do so, because it is not part of the secure communication session established between A and B). However, since the identity digital signature is generated from the identity claim data comprising the identity token, the identity public key fetched from the appropriate identity repository record(s) will only validate the identity digital signature in the case that the correct identity token (used to generate the identity digital signature) is present in the identity verification request message. The correct identity token will only be present in the identity verification request message if it was created during the same secure session between A and B during which the identity digital signature was created.

Furthermore, the IVS may be configured to validate the same identity verification request message (that is, an identity verification request message comprising the same hashed user information, identity token and identity digital signature) only once. Since, each genuine (i.e. non-fraudulent) identity claim message and identity verification request message will be different (even if the user information is the same, the identity claim message and identify verification request message will be different because the identity token will be different due to each identity claim message being transmitted from A to B during a different session), the risk of identity verification request messages being fraudulently replayed to the IVS is alleviated. It can thus be confirmed that an identity verification request message comprising the same hashed user information as a previous identity verification request message is not a repeat if the identity token (and so the identity digital signature) included in the later identity verification request message is different to that included in the previous identity verification request message.

In the case that an identity verification request message is determined to be a repeat, the IVS returns a negative response to the service from which the identity verification request message was sent indicating that the user identity check was unsuccessful.

In embodiments, all elements of the invention (e.g., IMO, IVS, service and users) can maintain logs of identity messages that they have received and sent as part of the present scheme, thereby allowing them to be audited within the scheme for the correct (non-fraudulent) operation of their roles. In particular, the service may keep such an audit log which records identity claim messages it receives from end users and responses it receives from the IVS to subsequent identity verification request messages (transmitted in response to the service receiving respective identity claim messages). This allows the service to prove it was correctly checking the identity of its end users in line with the regulations of its business domain (e.g., fighting money laundering by properly checking the identity of end users creating bank accounts, in the case that the service is a bank). When this scheme is correctly used by a service, every end user successfully registered with the service will have appropriate identity claim message(s) and corresponding identity verification response message(s) from the IVS that will verify their respective end user's identity. Logs of messages transmitted with the present scheme may be stored in an appropriate one of the storage mediums 104, 109, 114 and 119 of the respective first, second, third and fourth information processing devices 100, 105, 110 and 115, for example.

In embodiments, it is noted that identity private key and identity public key pair is created during the registration of a particular identity document by a user. Thus, as well as each identity private/public key pair being associated with a particular user, each identity private/public key pair is also associated with a particular document registered by that user. If a user has a plurality of identity documents registered with the IVS, they will also have a plurality of private/public key pairs each corresponding to a respective one of the plurality of registered identity documents.

Thus, in embodiments, the present technique provides a number of security measures.

Firstly, the use of the end user's identity digital signature means that only that end user can create valid new identity claims. In particular, a service cannot create a valid identity verification request message without the identity signature being included in the identity verification request message (without a valid identity signature, there can be no verification using the identity public key stored in the IVS database).

Secondly, the use of the identity token which is valid only for a temporary communication session within a secure communication channel between the end-user and service prevents a third party from fraudulently intercepting and resending identity claim messages after the temporary communication session has ended. This helps prevent anyone except the correct-end user (holding the identity private key)

from making valid identity claims. For example, it allows a user to authenticate with a service, but prevents that service (which actually knows the identity of the user at this point) personating the user to another service (or user). It also prevents any third party from personating the user.

There is a negligibly small chance that a party may be able to capture a valid identity claim message from an end user and to construct and transmit a valid identity verification request message to the IVS (this assumes that this constructed identity verification request message is sent it to the IVS before the intended service has had a chance to send the identity verification request message, since duplicate identity verification request messages are rejected by the IVS). However, all that is gained in this case is some personal information and the ability to verify this. The party would not be able to justify (during an audit) having this information, since it would not be able to demonstrate the session private key (or other information) which lead to the user providing the identity token in the identity claim message. Due to the lack of session private key (or other information), it would also not be able to validate the identity token, and so would not actually know the information it had intercepted was not itself personation. Furthermore, it would not be able to personate the end user to another service because it lacks the private identity key to create the identity signature for any such identity claim message to that other service.

Thirdly, by the identity digital signature being generated from a message (the identity claim data) including the identity token, the identity digital signature is different for different sessions between the end-user and service. This helps prevent a third party from fraudulently intercepting and resending identity verification request messages to the IVS at a later time. The identity signature is created by signing the identity claim data (which is based in part upon the identity token) with the identity private key. The identity token is based on information in the claim message that links the message to the temporary session between the service and the user. For example, the service provides a session public key (or other information) to allow the identity token to be generated using the personal information and, optionally, other elements of the identity claim message. This ensures that the identity token relates specifically to the temporary session in which a user makes a genuine claim to the service. The identity signature is then based on the identity token. The identity signature is specific to the identity token and hence to the user and their claim to the service.

In embodiments, both the identity claim message (as exemplified in FIG. 4C and as sent from an end user A to a service B, for example) and the identity verification request message (as exemplified in FIG. 4D and sent from the service B to the IVS, for example) include both the identity token and the identity digital signature. The identity digital signature is generated by digitally signing identity claim data, the identity claim data being information which is derivable from the identity verification request message. In other words, the identity claim data is a message generated using a portion of the information contained in the identity claim message. Verification of the identity digital signature at the IVS confirms that the identity verification request message has been generated from an identity claim message genuinely created by the end user A. The identity token is generated using information which is derivable from the identity claim message.

In other words, the identity token is generated from a message generated using a second portion of the information contained in the identity claim message. Verification of the identity token confirms that the identity claim message was generated by end user A during a specific temporary communication session established between A and B. The identity claim data used to generate the identity digital signature may include the identity token. That is, the portion of the identity claim message used to generate the identity claim data which is digitally signed by the identity digital signature comprises the identity token. In this case, verification of the identity digital signature by the IVS confirms that the received identity verification request message is not the result of a replayed set of identity information of the end user A and identity digital signature generated by the end user A by another end user (the other end user must establish a different session with B, thereby resulting in a different identity token being generated which cannot be verified by the original identity digital signature generated by end user A). Although, in embodiments, the identity token is generated based on the hashed identity information of the user, this is not necessarily the case. The identity token, more generally, may be based on any information derivable by B using information contained in the identity claim message (in particular, in the second portion of the identity claim message).

Some embodiments of the present technique are defined by the following numbered clauses:

Clause 1. A system for verifying information associated with a user, comprising a first information processing device, a second information processing device and a third information processing device, wherein: the first information processing device is configured to transmit to the second information processing device, a first message comprising information associated with the user, a unique identifier uniquely associated with the user associated information and an identity digital signature generated using an identity private key of an identity private key and identity public key pair associated with the user and a message generated using a portion of the first message; the second information processing device is configured to generate a hash of a portion of the user associated information combined with the unique identifier associated with the user associated information and transmit, to the third information processing device, a second message comprising the generated hash, the identity digital signature and the portion of the first message based on which the identity digital signature is generated; and the third information processing device is configured: to lookup the generated hash in a database relating a previously determined hash of the portion of the user associated information combined with the unique identifier associated with the user associated information with the identity public key of the identity private key and identity public key pair associated with the user, to verify the identity digital signature using the identity public key related to the generated hash in the database, and upon successful verification of the identity digital signature, to transmit a response to the second information processing device indicating the successful verification.

Clause 2. A system according to clause 1, wherein: the first message comprises an identity token, the identity token being valid for a temporary communication session between the first information processing device and second information processing device within which the first message is transmitted from the first information processing device to the second information processing device; and the second information processing device is configured to validate the identity token and to transmit the second message to the third information processing device only if the identity token is successfully validated.

Clause 3. A system according to clause 2, wherein the portion of the first message based on which the identity digital signature is generated comprises the identity token.

Clause 4. A system according to clause 2 or 3, wherein: the first information processing device is configured to generate the identity token based on a second portion of the first message and first session information valid for the temporary communication session between the first information processing device and second information processing device; and the second information processing device is configured to validate the identity token based on the second portion of the first message and second session information valid for the temporary communication session between the first information processing device and second information processing device, the second session information corresponding to the first session information.

Clause 5. A system according to clause 4, wherein the identity token comprises the second portion of the first message encrypted using a public encryption key of the second information processing device as the first session information and decryptable using a corresponding private decryption key of the second information processing device as the second session information.

Clause 6. A system according to clause 4, wherein the identity token comprises a session digital signature of the second portion of the first message generated using a private session key of the first information processing apparatus as the first session information and verifiable using a corresponding public session key of the first information processing apparatus as the second session information.

Clause 7. A system according to clause 4, wherein: the first and second session information is the same and is private to the first and second information processing devices, respectively; the identity token comprises a cryptographic hash of the second portion of the first message combined with the first session information; and the second information processing device is configured to validate the identity token by: generating a candidate identity token using the second portion of the first message combined with the second session information, comparing the candidate identity token with the identity token received from the first information processing device.

Clause 8. A system according to any preceding clause comprising a fourth data processing apparatus, wherein, in order to add the previously determined hash of the portion of the user associated information combined with the unique identifier associated with the user associated information and the related identity public key of the identity private key and identity public key pair associated with the user to the database: the first information processing device is configured to generate the identity private key and identity public key pair associated with the user and transmit the identity public key and user associated information to the fourth information processing device; the fourth information processing device is configured, upon successful completion of a checking procedure for checking validity of the user associated information: to generate the unique identifier associated with the user associated information; to determine the hash of the portion of the user associated information combined with the unique identifier associated with the user associated information, to transmit the hash of the portion of the user associated information combined with the unique identifier associated with the user associated information and the identity public key to the third information processing device, and to transmit the unique identifier associated with the user associated information to the first information processing device; and the third information processing device is configured to add the received hash of the portion of the user associated information combined with the unique identifier associated with the user associated information and the identity public key to the database.

Clause 9. A system according to any preceding clause, wherein the database is a shared ledger.

Clause 10. A system according to any preceding clause, wherein the information associated with the user is identity information of the user.

Clause 11. A first information processing device for use in a system for verifying information associated with a user, the system comprising the first information processing device, a second information processing device and a third information processing device, wherein the first information processing device comprises circuitry configured: to transmit, to the second information processing device, a first message comprising information associated with the user, a unique identifier uniquely associated with the user associated information and an identity digital signature generated using an identity private key of an identity private key and identity public key pair associated with the user and a message generated using a portion of the first message, wherein the second information processing device is configured to generate a hash of a portion of the user associated information combined with the unique identifier associated with the user associated information and transmit, to the third information processing device, a second message comprising the generated hash, the identity digital signature and the portion of the first message digitally signed with the identity digital signature, and the third information processing device is configured to lookup the generated hash in a database relating a previously determined hash of the portion of the user associated information combined with the unique identifier associated with the user associated information with the identity public key of the identity private key and identity public key pair associated with the user, to verify the identity digital signature using the identity public key related to the generated hash in the database, and upon successful verification of the identity digital signature, to transmit a response to the second information processing device indicating the successful verification.

Clause 12. A first information processing device according to clause 11, wherein the first message comprises an identity token, the identity token being valid for a temporary communication session between the first information processing device and second information processing device within which the first message is transmitted from the first information processing device to the second information processing device, wherein the second information processing device is configured to validate the identity token and to transmit the second message to the third information processing device only if the identity token is successfully validated.

Clause 13. A first information processing device according to clause 12, wherein the portion of the first message digitally signed by the identity digital signature comprises the identity token.

Clause 14. A first information processing device according to clause 12 or 13, wherein: the circuitry is configured to generate the identity token based on a second portion of the first message and first session information valid for the temporary communication session between the first information processing device and second information processing device; and the second information processing device is configured to validate the identity token based on the second portion of the first message and second session information valid for the temporary communication session between the first information processing device and second information processing device, the second session information corresponding to the first session information.

Clause 15. A first information processing device according to clause 14, wherein the identity token comprises the second portion of the first message encrypted using a public encryption key of the second information processing device as the first session information and decryptable using a corresponding private decryption key of the second information processing device as the second session information.

Clause 16. A first information processing device according to clause 14, wherein the identity token comprises a session digital signature of the second portion of the first message generated using a private session key of the first information processing apparatus as the first session information and verifiable using a corresponding public session key of the first information processing apparatus as the second session information.

Clause 17. A first information processing device according to clause 14, wherein: the first and second session information is the same and is private to the first and second information processing devices, respectively; the identity token comprises a cryptographic hash of the second portion of the first message combined with the first session information; and the second information processing device is configured to validate the identity token by: generating a candidate identity token using the second portion of the first message combined with the second session information, comparing the candidate identity token with the identity token received from the first information processing device.

Clause 18. A first information processing device according to any one of clauses 11 to 17, wherein the system comprises a fourth data processing apparatus and wherein, in order to add the previously determined hash of the portion of the user associated information combined with the unique identifier associated with the user associated information and the related identity public key of the identity private key and identity public key pair associated with the user to the database, the circuitry is configured: to generate the identity private key and identity public key pair associated with the user and transmit the identity public key and user associated information to the fourth information processing device, wherein the fourth information processing device is configured, upon successful completion of a checking procedure for checking validity of the user associated information to generate the unique identifier associated with the user associated information, to determine the hash of the portion of the user associated information combined with the unique identifier associated with the user associated information, and to transmit the hash of the portion of the user associated information combined with the unique identifier associated with the user associated information and the identity public key to the third information processing device, and wherein the third information processing device is configured to add the received hash of the portion of the user associated information combined with the unique identifier associated with the user associated information and the identity public key to the database; to receive, from the fourth data processing apparatus, the unique identifier associated with the user associated information to the first information processing device.

Clause 19. A first information processing device according to any one of clauses 11 to 18, wherein the information associated with the user is identity information of the user.

Clause 20. A second information processing device for use in system for verifying information associated with a user, the system comprising a first information processing device, the second information processing device and a third information processing device, wherein the second information processing device comprises circuitry configured: to receive, from the first information processing device, a first message comprising information associated with the user, a unique identifier uniquely associated with the user associated information and an identity digital signature generated using an identity private key of an identity private key and identity public key pair associated with the user and a message generated using a portion of the first message; to generate a hash of a portion of the user associated information combined with the unique identifier associated with the user associated information and transmit, to the third information processing device, a second message comprising the generated hash, the identity digital signature and the portion of the first message digitally signed with the identity digital signature, wherein the third information processing device is configured to lookup the generated hash in a database relating a previously determined hash of the portion of the user associated information combined with the unique identifier associated with the user associated information with the identity public key of the identity private key and identity public key pair associated with the user, to verify the identity digital signature using the identity public key related to the generated hash in the database, and upon successful verification of the identity digital signature, to transmit a response to the second information processing device indicating the successful verification.

Clause 21. A second information processing device according to clause 20, wherein the first message comprises an identity token, the identity token being valid for a temporary communication session between the first information processing device and second information processing device within which the first message is transmitted from the first information processing device to the second information processing device; and to validate the identity token and to transmit the second message to the third information processing device only if the identity token is successfully validated.

Clause 22. A second information processing device according to clause 21, wherein the portion of the first message digitally signed by the identity digital signature comprises the identity token.

Clause 23. A second information processing device according to clause 21 or 22, wherein: the first information processing device is configured to generate the identity token based on a second portion of the first message and first session information valid for the temporary communication session between the first information processing device and second information processing device; and the circuitry is configured to validate the identity token based on the second portion of the first message and second session information valid for the temporary communication session between the first information processing device and second information processing device, the second session information corresponding to the first session information.

Clause 24. A second information processing device according to clause 23, wherein the identity token comprises the second portion of the first message encrypted using a public encryption key of the second information processing device as the first session information and decryptable using a corresponding private decryption key of the second information processing device as the second session information.

Clause 25. A second information processing device according to clause 23, wherein the identity token comprises a session digital signature of the second portion of the first message generated using a private session key of the first information processing apparatus as the first session information and verifiable using a corresponding public session key of the first information processing apparatus as the second session information.

Clause 26. A second information processing device according to clause 23, wherein: the first and second session information is the same and is private to the first and second information processing devices, respectively; the identity token comprises a cryptographic hash of the second portion of the first message combined with the first session information; and the circuitry is configured to validate the identity token by: generating a candidate identity token using the second portion of the first message combined with the second session information, comparing the candidate identity token with the identity token received from the first information processing device.

Clause 27. A second information processing device according to any one of clauses 20 to 26, wherein the information associated with the user is identity information of the user.

Clause 28. A third information processing device for use in a system for verifying information associated with a user, the system comprising a first information processing device, a second information processing device and the third information processing device, wherein the first information processing device is configured to transmit, to the second information processing device, a first message comprising information associated with the user, a unique identifier uniquely associated with the user associated information and an identity digital signature generated using an identity private key of an identity private key and identity public key pair associated with the user and a message generated using a portion of the first message and the second information processing device is configured to generate a hash of a portion of the user associated information combined with the unique identifier associated with the user associated information, wherein the third information processing device comprises circuitry configured to: receive, from the second information processing device, a second message comprising the generated hash, the identity digital signature and the portion of the first message digitally signed with the identity digital signature; to lookup the generated hash in a database relating a previously determined hash of the portion of the user associated information combined with the unique identifier associated with the user associated information with the identity public key of the identity private key and identity public key pair associated with the user, to verify the identity digital signature using the identity public key related to the generated hash in the database, and upon successful verification of the identity digital signature, to transmit a response to the second information processing device indicating the successful verification.

Clause 29. A third information processing device according to clause 28, wherein the first message comprises an identity token, the identity token being valid for a temporary communication session between the first information processing device and second information processing device within which the first message is transmitted from the first information processing device to the second information processing device, and the second information processing device is configured to validate the identity token and to transmit the second message to the third information processing device only if the identity token is successfully validated.

Clause 30. A third information processing device according to clause 29, wherein the portion of the first message digitally signed by the identity digital signature comprises the identity token.

Clause 31. A third information processing device according to clause 29 or 30, wherein: the first information processing device is configured to generate the identity token based on a second portion of the first message and first session information valid for the temporary communication session between the first information processing device and second information processing device; and the second information processing device is configured to validate the identity token based on the second portion of the first message and second session information valid for the temporary communication session between the first information processing device and second information processing device, the second session information corresponding to the first session information.

Clause 32. A third information processing device according to clause 31, wherein the identity token comprises the second portion of the first message encrypted using a public encryption key of the second information processing device as the first session information and decryptable using a corresponding private decryption key of the second information processing device as the second session information.

Clause 33. A third information processing device according to clause 31, wherein the identity token comprises a session digital signature of the second portion of the first message generated using a private session key of the first information processing apparatus as the first session information and verifiable using a corresponding public session key of the first information processing apparatus as the second session information.

Clause 34. A third information processing device according to clause 31, wherein: the first and second session information is the same and is private to the first and second information processing devices, respectively; the identity token comprises a cryptographic hash of the second portion of the first message combined with the first session information; and the second information processing device is configured to validate the identity token by: generating a candidate identity token using the second portion of the first message combined with the second session information, comparing the candidate identity token with the identity token received from the first information processing device.

Clause 35. A third information processing device according to any one of clauses 28 to 34, wherein the system comprises a fourth data processing apparatus and wherein, in order to add the previously determined hash of the portion of the user associated information combined with the unique identifier associated with the user associated information and the related identity public key of the identity private key and identity public key pair associated with the user to the database, the first information processing device is configured to generate the identity private key and identity public key pair associated with the user and transmit the identity public key and user associated information to the fourth information processing device, the fourth information processing device is configured, upon successful completion of a checking procedure for checking validity of the user associated information, to generate the unique identifier associated with the user associated information, to determine the hash of the portion of the user associated information combined with the unique identifier associated with the user associated information and to transmit the unique identifier associated with the user associated information to the first information processing device, wherein the circuitry is configured: to receive, from the fourth data processing device, the hash of the portion of the user associated information combined with the unique identifier associated with the user associated information and the identity public key; and to add the received hash of the portion of the user associated information combined with the unique identifier associated with the user associated information and the identity public key to the database.

Clause 36. A third information processing device according to any one of clauses 28 to 35, wherein the database is a shared ledger.

Clause 37. A third information processing device according to any one of clauses 38 to 36, wherein the information associated with the user is identity information of the user.

Clause 38. A fourth information processing device for use in a system for verifying information associated with a user, the system comprising a first information processing device, a second information processing device, a third information processing device and the fourth information processing device, wherein: the first information processing device is configured to transmit, to the second information processing device, a first message comprising information associated with the user, a unique identifier uniquely associated with the user associated information and an identity digital signature generated using an identity private key of an identity private key and identity public key pair associated with the user and a message generated using a portion of the first message; the second information processing device is configured to generate a hash of a portion of the user associated information combined with the unique identifier associated with the user associated information and transmit, to the third information processing device, a second message comprising the generated hash, the identity digital signature and the portion of the first message digitally signed with the identity digital signature; and the third information processing device is configured: to lookup the generated hash in a database relating a previously determined hash of the portion of the user associated information combined with the unique identifier associated with the user associated information with the identity public key of the identity private key and identity public key pair associated with the user, to verify the identity digital signature using the identity public key related to the generated hash in the database, and upon successful verification of the identity digital signature, to transmit a response to the second information processing device indicating the successful verification; and in order to add the previously determined hash of the portion of the user associated information combined with the unique identifier associated with the user associated information and the related identity public key of the identity private key and identity public key pair associated with the user to the database, the first information processing device is configured to generate the identity private key and identity public key pair associated with the user; wherein the fourth information processing device comprises circuitry configured: to receive, from the first information processing device, the identity public key and user associated information; and upon successful completion of a checking procedure for checking validity of the user associated information: to generate the unique identifier associated with the user associated information; to determine the hash of the portion of the user associated information combined with the unique identifier associated with the user associated information, to transmit the hash of the portion of the user associated information combined with the unique identifier associated with the user associated information and the identity public key to the third information processing device, and to transmit the unique identifier associated with the user associated information to the first information processing device; wherein the third information processing device is configured to add the received hash of the portion of the user associated information combined with the unique identifier associated with the user associated information and the identity public key to the database.

Clause 39. A fourth information processing device according to clause 38, wherein the information associated with the user is identity information of the user.

Clause 40. A method of verifying information associated with a user, the method comprising: controlling a first information processing device to transmit, to a second information processing device, a first message comprising information associated with the user, a unique identifier uniquely associated with the user associated information and an identity digital signature generated using an identity private key of an identity private key and identity public key pair associated with the user and a message generated using a portion of the first message; controlling the second information processing device to generate a hash of a portion of the user associated information combined with the unique identifier associated with the user associated information and transmit, to the third information processing device, a second message comprising, the generated hash, the identity digital signature and the portion of the first message digitally signed with the identity digital signature; and controlling the third information processing device: to lookup the generated hash in a database relating a previously determined hash of the portion of the user associated information combined with the unique identifier associated with the user associated information with the identity public key of the identity private key and identity public key pair associated with the user, to verify the identity digital signature using the identity public key related to the generated hash in the database, and upon successful verification of the identity digital signature, to transmit a response to the second information processing device indicating the successful verification.

Clause 41. A method of operating a first information processing device for use in a system for verifying information associated with a user, the system comprising the first information processing device, a second information processing device and a third information processing device, wherein the method comprises controlling the first information processing device to transmit, to the second information processing device, a first message comprising information associated with the user, a unique identifier uniquely associated with the user associated information and an identity digital signature generated using an identity private key of an identity private key and identity public key pair associated with the user and a message generated using a portion of the first message, wherein the second information processing device is configured to generate a hash of the portion of the user associated information combined with the unique identifier associated with the user associated information and transmit, to the third information processing device, a second message comprising the generated hash, the identity digital signature and the portion of the first message digitally signed with the identity digital signature, and the third information processing device is configured to lookup the generated hash in a database relating a previously determined hash of the portion of the user associated information combined with the unique identifier associated with the user associated information with the identity public key of the identity private key and identity public key pair associated with the user, to verify the identity digital signature using the identity public key related to the generated hash in the database, and upon successful verification of the identity digital signature, to transmit a response to the second information processing device indicating the successful verification.

Clause 42. A method of operating a second information processing device for use in system for verifying information associated with a user, the system comprising a first information processing device, the second information processing device and a third information processing device, wherein method comprises controlling the second information processing device: to receive, from the first information processing device, a first message comprising information associated with the user, a unique identifier uniquely associated with the user associated information and an identity digital signature generated using an identity private key of an identity private key and identity public key pair associated with the user and a message generated using a portion of the first message; to generate a hash of a portion of the user associated information combined with the unique identifier associated with the user associated information and transmit, to the third information processing device, a second message comprising the generated hash, the identity digital signature and the portion of the first message digitally signed with the identity digital signature, wherein the third information processing device is configured to lookup the generated hash in a database relating a previously determined hash of the portion of the user associated information combined with the unique identifier associated with the user associated information with the identity public key of the identity private key and identity public key pair associated with the user, to verify the identity digital signature using the identity public key related to the generated hash in the database, and upon successful verification of the identity digital signature, to transmit a response to the second information processing device indicating the successful verification.

Clause 43. A method of operating a third information processing device for use in a system for verifying information associated with a user, the system comprising a first information processing device, a second information processing device and the third information processing device, wherein the first information processing device is configured to transmit, to the second information processing device, a first message comprising information associated with the user, a unique identifier uniquely associated with the user associated information and an identity digital signature generated using an identity private key of an identity private key and identity public key pair associated with the user and a message generated using a portion of the first message and the second information processing device is configured to generate a hash of a portion of the user associated information combined with the unique identifier associated with the user associated information, wherein the method comprises controlling the third information processing device: to receive, from the second information processing device, a second message comprising the generated hash, the identity digital signature and the portion of the first message digitally signed with the identity digital signature; to lookup the generated hash in a database relating a previously determined hash of the portion of the user associated information combined with the unique identifier associated with the user associated information with the identity public key of the identity private key and identity public key pair associated with the user, to verify the identity digital signature using the identity public key related to the generated hash in the database, and upon successful verification of the identity digital signature, to transmit a response to the second information processing device indicating the successful verification.

Clause 44. A method of operating a fourth information processing device for use in a system for verifying information associated with a user, the system comprising a first information processing device, a second information processing device, a third information processing device and the fourth information processing device, wherein: the first information processing device is configured to transmit, to the second information processing device, a first message comprising information associated with the user, a unique identifier uniquely associated with the user associated information and an identity digital signature generated using an identity private key of an identity private key and identity public key pair associated with the user and a message generated using a portion of the first message; the second information processing device is configured to generate a hash of a portion of the user associated information combined with the unique identifier associated with the user associated information and transmit, to the third information processing device, a second message comprising the generated hash, the identity digital signature and the portion of the first message digitally signed with the identity digital signature; and the third information processing device is configured: to lookup the generated hash in a database relating a previously determined hash of the portion of the user associated information combined with the unique identifier associated with the user associated information with the identity public key of the identity private key and identity public key pair associated with the user, to verify the identity digital signature using the identity public key related to the generated hash in the database, and upon successful verification of the identity digital signature, to transmit a response to the second information processing device indicating the successful verification; and in order to add the previously determined hash of the portion of the user associated information combined with the unique identifier associated with the user associated information and the related identity public key of the identity private key and identity public key pair associated with the user to the database, the first information processing device is configured to generate the identity private key and identity public key pair associated with the user to the database; wherein the method comprises controlling the fourth information processing device: to receive, from the first information processing device, the identity public key and user associated information to the fourth information processing device; and upon successful completion of a checking procedure for checking validity of the user associated information: to generate the unique identifier associated with the user associated information; to determine the hash of the portion of the user associated information combined with the unique identifier associated with the user associated information, to transmit the hash of the portion of the user associated information combined with the unique identifier associated with the user associated information and the identity public key to the third information processing device, and to transmit the unique identifier associated with the user associated information to the first information processing device; wherein the third information processing device is configured to add the received hash of the portion of the user associated information combined with the unique identifier associated with the user associated information and the identity public key to the database.

Clause 45. A program for controlling a computer to perform a method according to any one of clauses 40 to 44.

Clause 46. A storage medium storing a program according to clause 45.

Although, in some of the above-mentioned embodiments, the present technique is applied as part of an electronic payments scheme, it will be appreciated that this is only an example and that the present technique may be applied to any other scheme involving the transfer of electronic messages from one party to another (e.g., over a computer network). Such electronic messages may be, for example, electronic communication messages (e.g., sent via an instant messaging platform), electronic messages comprising computer code (e.g., software updates or the like) or automatically generated transaction confirmation messages (e.g., electronic invoices, receipts, booking confirmations or the like). Other types of electronic message are also envisaged.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

What is claimed is:

1. A system for verifying information associated with a user, comprising a first information processor device, a second information processor device and a third information processor device, wherein:
the first information processor device is configured to
transmit to the second information processor device: a first message comprising information associated with the user, a unique identifier uniquely associated with the user associated information and an identity digital signature generated using an identity private key of an identity private key and identity public key pair associated with the user and a message generated using a portion of the first message, wherein the first message comprises an identity token, the identity token being valid for a temporary communication session between the first information processor device and second information processor device within which the first message is transmitted from the first information processor device to the second information processor device;
the second information processor device is configured to:
generate a hash of a portion of the user associated information combined with the
unique identifier associated with the user associated information; and
validate the identity token;
transmit, to the third information processor device only if the identity token is successfully validated, a second message comprising the generated hash, the identity digital signature and the portion of the first message based on which the identity
digital signature is generated, wherein the portion of the first message based on which the identity digital signature is generated comprises the identity token; and
the third information processor device is configured:
to lookup the generated hash in a database relating a previously determined hash of the portion of the user associated information combined with the unique identifier associated with the user associated information with the identity public key of the identity private key and identity public key pair associated with the user,
to verify the identity digital signature using the identity public key related to the generated hash in the database, and
upon successful verification of the identity digital signature, to transmit a response to the second information processor device indicating the successful verification.

2. The system according to claim 1, wherein:
the first information processor device is configured to generate the identity token based on a second portion of the first message and first session information valid for the temporary communication session between the first information processor device and second information processor device.

3. The system according to claim 1, wherein:
the second information processor device is configured to validate the identity token based on a second portion of the first message and second session information valid for the temporary communication session between the first information processor device and second information processor device, the second session information corresponding to the first session information.

4. The system according to claim 1, further comprising a fourth information processor device, wherein the fourth information processor device comprises circuitry configured:
to receive, from a first information processor device, the identity public key and user associated information; and
upon successful completion of a checking procedure for checking validity of the user associated information:
to generate the unique identifier associated with the user associated information; to determine the hash of the portion of the user associated information combined with the unique identifier associated with the user associated information, to transmit the hash of the portion of the user associated information combined with the unique identifier associated with the user associated information and the identity public key to the third information processor device, and to transmit the unique identifier associated with the user associated information to the first information processor device.

5. The system according to claim 4, wherein the third information processor device is configured to add the received hash of the portion of the user associated information combined with the unique identifier associated with the user associated information and the identity public key to the database.

6. A method comprising:

transmitting from a first information processor device to a second information processor device:

a first message comprising information associated with a user, a unique identifier uniquely associated with a user associated information and an identity digital signature generated using an identity private key of an identity private key and identity public key pair associated with the user and a message generated using a portion of the first message, wherein the first message comprises an identity token, the identity token being valid for a temporary communication session between the first information processor device and second information processor device within which the first message is transmitted from the first information processor device to the second information processor device;

generating, at the second information processor device, a hash of a portion of the user associated information combined with the unique identifier associated with the user associated information;

validating, at the second information processor device, the identity token;

transmitting, to a third information processor device only if the identity token is successfully validated, a second message comprising the generated hash, the identity digital signature and the portion of the first message based on which the identity digital signature is generated, wherein the portion of the first message based on which the identity digital signature is generated comprises the identity token; and looking up the generated hash, at the third information processor device, in a database relating a previously determined hash of the portion of the user associated information combined with the unique identifier associated with the user associated information with the identity public key of the identity private key and identity public key pair associated with the user, verifying, at the third information processor device, the identity digital signature using the identity public key related to the generated hash in the database, and upon successful verification of the identity digital signature, transmitting a response from the third information processor device to the second information processor device indicating the successful verification.

* * * * *